United States Patent
Saleh et al.

(10) Patent No.: US 11,860,856 B2
(45) Date of Patent: Jan. 2, 2024

(54) MANAGING DISTRIBUTED LEDGER STORAGE SPACE

(71) Applicant: International Business Machines Corporation, Armonk, NY (US)

(72) Inventors: Ahmed Mohamed Abbas Saleh, Sheikh Zayed (EG); Karen Medhat Yousry Fahmy Beshara, Giza (EG); Labib Farag Labib Hanna Saad, New Cairo (EG)

(73) Assignee: International Business Machines Corporation, Armonk, NY (US)

( * ) Notice: Subject to any disclaimer, the term of this patent is extended or adjusted under 35 U.S.C. 154(b) by 797 days.

(21) Appl. No.: 16/933,196

(22) Filed: Jul. 20, 2020

(65) Prior Publication Data
US 2022/0019901 A1   Jan. 20, 2022

(51) Int. Cl.
*G06F 16/23*        (2019.01)
(52) U.S. Cl.
CPC ...... *G06F 16/2379* (2019.01); *G06F 16/2365* (2019.01)
(58) Field of Classification Search
CPC .................. G06F 16/2379; G06F 16/2365
See application file for complete search history.

(56) References Cited

U.S. PATENT DOCUMENTS

| | | | |
|---|---|---|---|
| 9,916,372 B1 * | 3/2018 | Hurst | G06F 16/273 |
| 10,339,014 B2 | 7/2019 | Smith et al. | |
| 10,417,219 B1 * | 9/2019 | Yang | H04L 9/0643 |
| 10,503,905 B1 * | 12/2019 | Misra | G06F 21/64 |
| 11,062,042 B1 * | 7/2021 | McKervey | H04L 63/123 |
| 11,120,513 B2 * | 9/2021 | Yang | G06Q 40/02 |
| 2017/0031676 A1 * | 2/2017 | Cecchetti | G06F 8/65 |
| 2018/0129700 A1 | 5/2018 | Naccache et al. | |
| 2018/0218027 A1 | 8/2018 | Cronie et al. | |
| 2019/0034507 A1 * | 1/2019 | Duttagupta | G06F 16/1752 |
| 2019/0065788 A1 | 2/2019 | Vijayasankar et al. | |
| 2019/0079998 A1 | 3/2019 | Rush | |
| 2019/0286629 A1 | 9/2019 | Song et al. | |
| 2019/0372772 A1 | 12/2019 | Novotny et al. | |
| 2021/0109902 A1 * | 4/2021 | Glasser | H04L 9/3239 |
| 2021/0367790 A1 * | 11/2021 | Zhuo | H04L 9/3247 |

FOREIGN PATENT DOCUMENTS

WO   2018119587 A1   7/2018

OTHER PUBLICATIONS

Arslan et al., Compress-Store on Blockchain: A Decentralized Data Processing and Immutable Storage for Multimedia Streaming, arXiv:1905.10458v1 [cs.DC], May 24, 2019.

* cited by examiner

*Primary Examiner* — Huawen A Peng

(57) ABSTRACT

An example operation includes one or more of receiving a block, extracting information from the block, correlating an identifier to the information as previously stored in a first storage area, replacing the information in the block with the identifier, and submitting the block with the identifier for storage in a second storage area. The identifier links to the information previously stored in the first storage area in order to allow for recovery of the information, and at least the second storage area is in a blockchain.

20 Claims, 29 Drawing Sheets

| 71 | 72 |
|---|---|
| Digital Certificate A | TransactionID #1 |
| Scanned Document-1 | TransactionID #24 |
| Image4.jpg | TransactionID #16 |
| ⋮ | ⋮ |
| Digital Certificate K | TransactionID #147 |

| Outlook | Temperature | Humidity | Windy |
|---|---|---|---|
| sunny | hot | high | FALSE |
| sunny | hot | high | TRUE |
| overcast | hot | high | FALSE |
| rainy | mild | high | FALSE |
| rainy | cool | normal | FALSE |
| rainy | cool | normal | TRUE |
| overcast | cool | normal | TRUE |
| sunny | mild | high | FALSE |
| sunny | cool | normal | FALSE |
| rainy | mild | normal | FALSE |
| sunny | mild | normal | TRUE |
| overcast | mild | high | TRUE |
| overcast | hot | normal | FALSE |
| rainy | mild | high | TRUE |

| Outlook | Temperature | Humidity | Windy |
|---|---|---|---|
| sunny | hot | high | FALSE |
| sunny | hot | high | TRUE |
| sunny | mild | high | FALSE |
| sunny | cool | normal | FALSE |
| sunny | mild | normal | TRUE |

| Feature Value Pairs | Value of Optimum Grouping |
|---|---|
| Outlook = Sunny | g = 1 |
| Outlook = overcast | g = 1 |
| Outlook = rainy | g = 0.889 |
| Temp = hot | g = 0.889 |
| Temp = mild | g = 1 |
| Temp = cool | g = 0.8333 |
| Humidity = high | g = 0.8333 |
| Windy = false | g = 1 |

504

507

| Property \Category of the values | c | O | R | N | T |
|---|---|---|---|---|---|
| Outlook | | Linked list of one node: Transaction# 8 | Linked list of one node: Transaction# 7 | | |
| Temperate | Linked list of one node: Transaction# 7 | | | | |
| HUMIDITY | | | | Linked list of one node: Transaction# 7 | |
| WINDY | | | | | Linked list of one node: Transaction#7 |

Quantum-Secured
Blockchain
852

MANAGING DISTRIBUTED LEDGER STORAGE SPACE

BACKGROUND

A centralized database stores and maintains data in a single database (e.g., a database server) at one location. This location is often a central computer, for example, a desktop central processing unit (CPU), a server CPU, or a mainframe computer. Information stored on a centralized database is typically accessible from multiple different points. Multiple users or client workstations can work simultaneously on the centralized database, for example, based on a client/server configuration. A centralized database is easy to manage, maintain, and control, especially for purposes of security because of its single location. Within a centralized database, data redundancy is minimized as a single storing place of all data also implies that a given set of data only has one primary record.

SUMMARY

One example embodiment provides a system that includes one or more of a receiver to receive a block, an extractor to extract information from the block, a correlator to correlate an identifier to the information as previously stored in a first storage area and to replace the information in the block with the identifier, and a manager to submit the block with the identifier for storage in a second storage area. The identifier links to the information previously stored in the first storage area in order to allow for recovery of the information, and at least the second storage area is in a blockchain.

Another example embodiment provides a method that includes one or more of receiving a block, extracting information from the block, correlating an identifier to the information as previously stored in a first storage area, replacing the information in the block with the identifier, and submitting the block with the identifier for storage in a second storage area. The identifier links to the information previously stored in the first storage area in order to allow for recovery of the information, and at least the second storage area is in a blockchain.

A further example embodiment provides a non-transitory computer readable medium comprising instructions, that when read by a processor, cause the processor to perform one or more of receiving a block, extracting information from the block, correlating an identifier to the information as previously stored in a first storage area, replacing the information in the block with the identifier, and submitting the block with the identifier for storage in a second storage area. The identifier links to the information previously stored in the first storage area in order to allow for recovery of the information, and at least the second storage area is in a blockchain.

BRIEF DESCRIPTION OF THE DRAWINGS

FIG. 1B illustrates an example of a dictionary included in or used by the system.

FIG. 5C illustrates an example of transaction data of a data set.

FIG. 5D illustrates an example of processed transaction data derived from the data set.

FIG. 5I illustrates an example of the dictionary including identifiers.

DETAILED DESCRIPTION

Figure 1A:
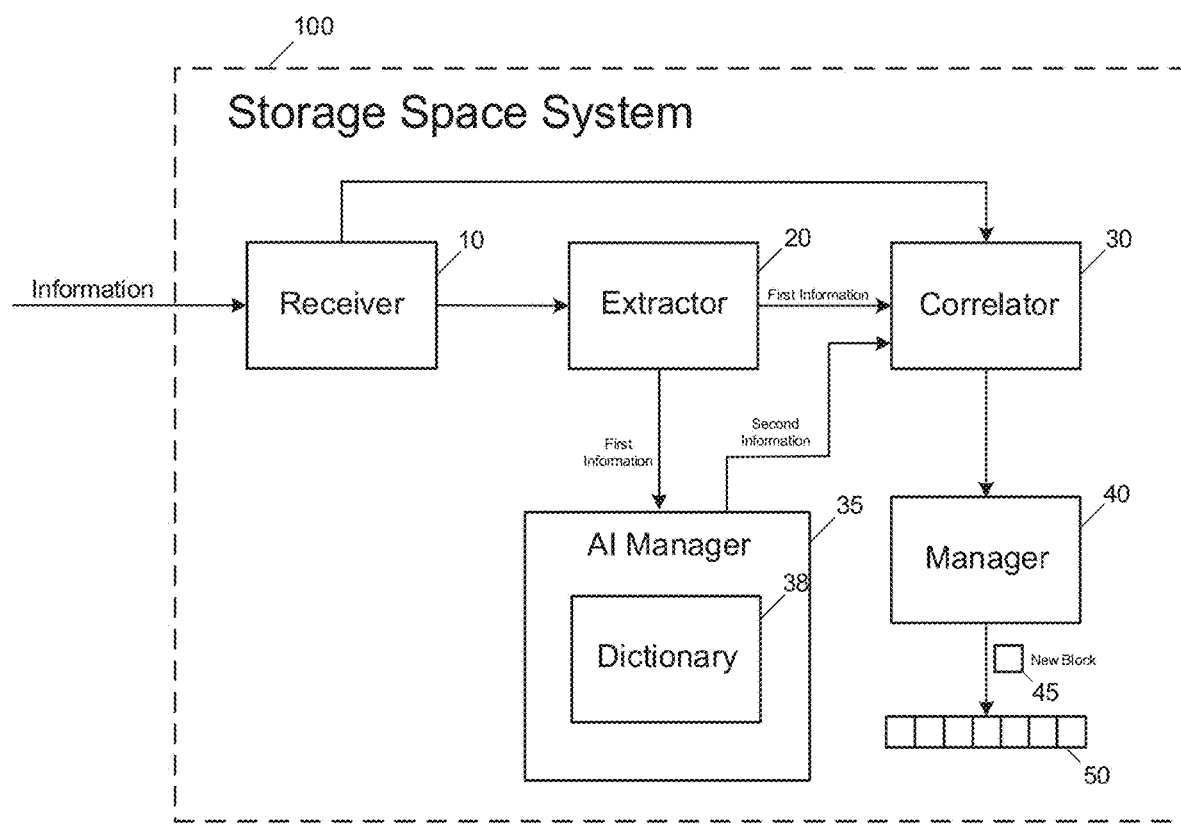
FIG. 1A illustrates a network diagram of a system including a database according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined or removed in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined or removed in any suitable manner in one or more embodiments. Further, in the diagrams, any connection between elements can permit one-way and/or two-way communication even if the depicted connection is a one-way or two-way arrow. Also, any device depicted in the drawings can be a different device. For example, if a mobile device is shown sending information, a wired device could also be used to send the information.

In addition, while the term "message" may have been used in the description of embodiments, other types of network data, such as, a packet, frame, datagram, etc. may also be used. Furthermore, while certain types of messages and signaling may be depicted in exemplary embodiments they are not limited to a certain type of message and signaling In one embodiment the application utilizes a decentralized database (such as a blockchain) that is a distributed storage system, which includes multiple nodes that communicate with each other. The decentralized database includes an append-only immutable data structure resembling a distributed ledger capable of maintaining records between mutually untrusted parties. The untrusted parties are referred to herein as peers or peer nodes. Each peer maintains a copy of the database records and no single peer can modify the database records without a consensus being reached among the distributed peers. For example, the peers may execute a consensus protocol to validate blockchain storage transactions, group the storage transactions into blocks, and build a hash chain over the blocks. This process forms the ledger by ordering the storage transactions, as is necessary, for consistency. In various embodiments, a permissioned and/or a permissionless blockchain can be used. In a public or permission-less blockchain, anyone can participate without a specific identity. Public blockchains can involve native crypto-currency and use consensus based on various protocols such as Proof of Work (PoW). Conversely, a permissioned blockchain database provides secure interactions among a group of entities which share a common goal but which do not fully trust one another, such as businesses that exchange funds, goods, information, and the like.

This application can utilize a blockchain that operates arbitrary, programmable logic, tailored to a decentralized storage scheme and referred to as "smart contracts" or "chaincodes." In some cases, specialized chaincodes may exist for management functions and parameters which are referred to as system chaincode. The application can further utilize smart contracts that are trusted distributed applications which leverage tamper-proof properties of the blockchain database and an underlying agreement between nodes, which is referred to as an endorsement or endorsement policy. Blockchain transactions associated with this application can be "endorsed" before being committed to the blockchain while transactions, which are not endorsed, are disregarded. An endorsement policy allows chaincode to specify endorsers for a transaction in the form of a set of peer nodes that are necessary for endorsement. When a client sends the transaction to the peers specified in the endorsement policy, the transaction is executed to validate the transaction. After validation, the transactions enter an ordering phase in which a consensus protocol is used to produce an ordered sequence of endorsed transactions grouped into blocks.

This application can utilize nodes that are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits a transaction-invocation to an endorser (e.g., peer), and broadcasts transaction-proposals to an ordering service (e.g., ordering node). Another type of node is a peer node which can receive client submitted transactions, commit the transactions and maintain a state and a copy of the ledger of blockchain transactions. Peers can also have the role of an endorser. An ordering-service-node or orderer is a node running the communication service for all nodes, and which implements a delivery guarantee, such as a broadcast to each of the peer nodes in the system when committing transactions and modifying a world state of the blockchain. The world state can constitute the initial blockchain transaction which normally includes control and setup information.

This application can utilize a ledger that is a sequenced, tamper-resistant record of all state transitions of a blockchain. State transitions may result from chaincode invocations (i.e., transactions) submitted by participating parties (e.g., client nodes, ordering nodes, endorser nodes, peer nodes, etc.). Each participating party (such as a peer node) can maintain a copy of the ledger. A transaction may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain.

This application can utilize a chain that is a transaction log which is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain transaction log. Since the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log and can therefore be regenerated from the chain at any time. The state database may automatically be recovered (or generated if needed) upon peer node startup, and before transactions are accepted.

Example embodiments provide methods, systems, components, non-transitory computer-readable media, devices, and/or networks which manage distributed ledger storage space. In accordance with one or more embodiments, information is received for storage in a decentralized database (e.g., for storage in a new block of a blockchain). A search is performed to determine whether the information includes a feature that has already been stored in a prior block of the blockchain. If the search indicates that the feature has been stored in a prior block, a replacement operation is performed that includes replacing the feature with an identifier that references or points to the prior block in the blockchain. The received information is then stored in the new block with the identifier instead of the feature. Because the identifier points to a prior block (or information in the prior block where the feature may be found) in the blockchain, the feature may be retrieved from the prior block using the identifier when the new block is subsequently queried.

In one embodiment, the replacement operation may be performed based on a decision tree, which is generated and/or maintained by an artificial intelligence manager. The artificial intelligence manager may be implemented based on execution of instructions by one or more processors. In one embodiment, the artificial intelligence manager may execute an unsupervised machine-learning algorithm that generates a model based on the decision tree for use in performing the replacement operation. Each node of the tree may be linked to a recurring feature previously stored in the database, along with an identifier that points to the storage area (e.g., block), or information in the storage area, where the recurring feature is stored. The decision tree may then be used as a basis for generating a dictionary which stores information indicative of the recurring features and their associated identifiers. The dictionary may be used as a basis for determining that a feature in newly received information to be stored is a recurring feature and for determining and accessing the identifier corresponding to that recurring feature. The dictionary may be stored as an auxiliary part of the ledger (e.g., world state) or may be stored in another area accessible by the node or other blockchain entity.

In one embodiment, the identifier may include a transactionID associated with the prior block storing the recurring feature. In one implementation, the recurring feature may be a <property, value> pair. Because the recurring feature may be substantially large in size, inserting the significantly smaller sized identifier into the new block in place of the recurring feature reduces the storage requirements of each block, and thereby increases the amount of information that may be stored in the same storage space of the blockchain ledger. This is especially the case when the recurring feature is a digital certificate, digital media, or other forms of digital information that may or may not consume relatively large amounts of storage space. In one embodiment, the identifier stored in the new block may be converted to a hash value.

Some benefits of one or more of the embodiments described herein include preventing the storage of recurring values in a blockchain. This may be accomplished by storing the original occurrence of a feature in a block of the blockchain, and then storing information (initially received with the same feature) in subsequent blocks of the blockchain with an identifier instead of the feature. This reduces the size of the ledger and/or allows the ledger to store more information in the same storage space, while at the same time allowing the feature to be recovered when the information stored in the subsequent blocks is queried. This is possible because the identifier references the prior block that initially stored the feature, thereby allowing for its recovery. The feature may be, for example, various types of digital information as described herein.

FIG. 1A illustrates an embodiment of a system 100 that manages storage space in a decentralized database. The decentralized database may include a blockchain or another type of decentralized storage area. For illustrative purposes, the database will be discussed as a blockchain. The system 100 may be included in an entity of the blockchain, including but not limited to a client, a node, an authority, administrator, validator, or other entity of the blockchain. The node may be an originating node, peer node, ordering service node, endorsing node, or another type of node.

Referring to FIG. 1A, the system includes a receiver 10, an extractor 20, a correlator 30, and a manager 40. The receiver 10 many be any type of interface that receives information to be stored in a new block of the blockchain. The information may include any type of information relating to an intended purpose of the blockchain. Examples include transactions, various forms of digital information, financial or data records, media data, sales data, and statistical information, just to name a few. In one embodiment, the received information may include a block, for example, including one or more types of the aforementioned information. The transactions may be cryptocurrency related or ones using other forms of payment, or may be other types of information that require secure storage in a private or public blockchain network. In one embodiment, the information may be received from an external source.

The extractor 20 analyzes the information received by the receiver to extract first information. The first information may be of a predetermined type or kind that has a likelihood of being repeatedly stored in the blockchain (the first information may be of any type or it may be predetermined type). The first information may, for example, be located in one or more predetermined fields of the received information. In one embodiment, the extractor may perform a keyword search to locate information that is likely to be recurring information stored in the blockchain. The first information may correspond to the entire information received by the receiver or a portion of that information as identified by the extractor. Examples of the first information include, but are not limited to, digital certificates, digital media (e.g., scanned documents, images, video, etc.), key information, or other types of data that has been identified, for example, by a smart contract or other code executed by the extractor for qualifying as possible recurring information subject to the replacement operation described herein.

The correlator 30 performs operations including correlating second information to a first storage area that has previously stored the first information. When the decentralized database is a blockchain, the correlator may correlate second information to a prior block in the blockchain which stores information that matches the first information extracted by the extractor 20. In a decentralized database that is not a blockchain, the first storage area may be any storage area existing in the database prior to receipt of the information by the receiver 10.

In one embodiment (described in greater detail below), the correlator 30 may include or communicate with an artificial intelligence manager 35 that maintains a model for generating and/or accessing second information that may be used as a basis for linking the extracted first information to the first storage area (or information in the first storage area) storing the first information. In one embodiment, the artificial intelligence manager 35 may manage a dictionary 38 including the second information. The dictionary may be based on a model that includes a decision tree, and the artificial intelligence manager 35 may generate and/or access the second information from the decision tree. In one embodiment, accessing second information may not require a decision tree.

The decision tree may be formulated in various ways. In one embodiment, the decision tree may include a plurality of nodes logically arranged at one or more levels, where each node corresponds to different first information and stores second information in association with that first information. For example, when the first information includes a digital certificate, the nodes of the tree may include different digital certificates for respective ones of a plurality of clients, parties, or participants of transactions stored on the blockchain. When the first information includes digital media, the nodes of the tree may include different digital media for respective ones of a plurality of clients, parties, or participates of transactions stored on the blockchain. (While the term "transaction" is used here, it is understood that the first information may relate to a financial transaction or may relate to a transaction in the sense of storing information unrelated to a financial transaction).

The different first information associated with the nodes of the decision tree constitute recurring information which, if not for the embodiments described herein, would be redundantly stored in an excessive number of blocks in the blockchain. However, in accordance with one or more embodiments, the correlator 30 operating in combination with the artificial intelligence manager 35 performs a replacement operation that substantially reduces the size of blocks (that otherwise would include the first information) to be newly appended to the blockchain and that therefore substantially reduces the size of the overall blockchain ledger. This may allow more information to be stored on the same storage space allocated to the blockchain.

Once the artificial intelligence manager 35 receives the first information (either from the extractor 20 or the correlator 30), the artificial manager 35 may perform a search or detection operation that involves analyzing (iterating) the decision tree of the dictionary 38 in order to determine whether one of the nodes of the tree corresponds to the first information. If a node is not found that corresponds to the first information, the correlator outputs the information received by the receiver 10, along with the first information, to the manager 40 for storage in a new block to be appended to the blockchain. When a node is found that corresponds to the first information, the second information corresponding to that node is retrieved from the dictionary and sent to the correlator 30. The correlator then performs a replacement operation which includes replacing the first information with the second information.

As previously indicated, the second information may be in a variety of forms. For example, the second information may be a transactionID of a transaction stored in a prior block in the blockchain that includes a full version of the first information. In one embodiment, the second information may include a type of identifier or pointer different from a transactionID. For example, the second information may include an identifier that points to the first storage area (e.g., a block number of a prior block in the blockchain, or a transaction number, address, or field in a prior block) storing the first information. The artificial intelligence manager 35 may be programmed to retrieve that first information from the first storage area when the newly appended block is substantially queried in the blockchain network. In one embodiment, the identifier or pointer may be an address of the first storage area in a decentralized database, e.g., blockchain or another type of decentralized database.

FIG. 1B shows a conceptual embodiment of dictionary 38 which the artificial intelligence manager 35 may use to correlate second information 72 to a second storage area storing the first information 71. In this conceptual embodiment, the dictionary 38 includes a variety of types of digital information as first information arranged in relation to corresponding transactionIDs serving as the identifiers corresponding to the second information.

Returning to FIG. 1A, the replacement operation performed by the correlator 30 includes modifying the information received by the receiver 10, by replacing the first information (e.g., digital certificate) with the second information (e.g., transactionID of a transaction in a prior block of the blockchain storing the digital certificate). The information including the second information is then output to the manager 40.

The manager 40 stores the information received by receiver 10 in a second storage area with the second information in place of the first information. The second storage area may be a new block 45 to be added to the blockchain 50, or a storage area different from the first storage area when the decentralized database is different from a blockchain database.

Figure 1C:
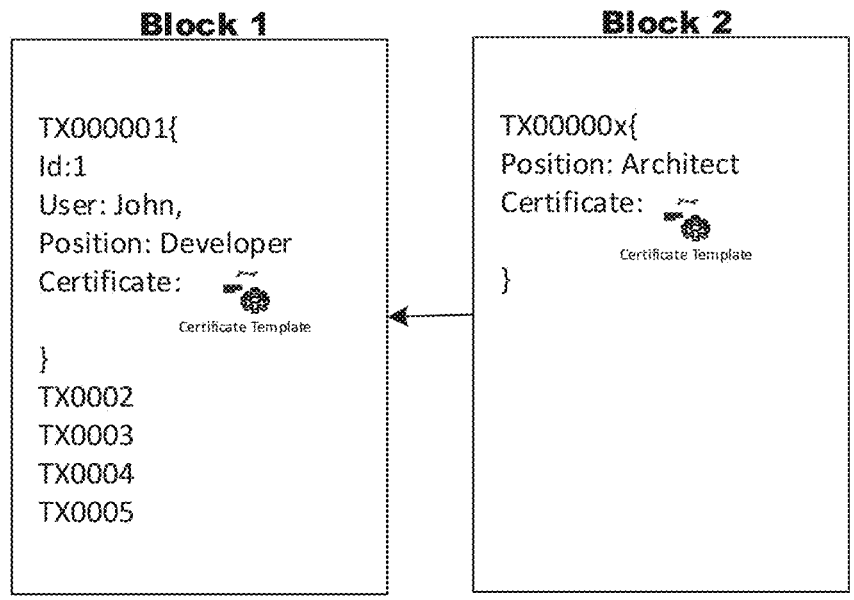
FIG. 1C illustrates an example of blocks that both include first information.

FIG. 1C shows an example of the first storage area 110 as Block 1 and the second storage area as Block 2 if the replacement operation of the one or more embodiments described herein is not performed. In this case, Block 1 and Block 2 both store the first information, which is illustratively shown as a digital certificate. Because Block 2 stores the first information, the storage space of the decentralized database is reduced.

Figure 1D:
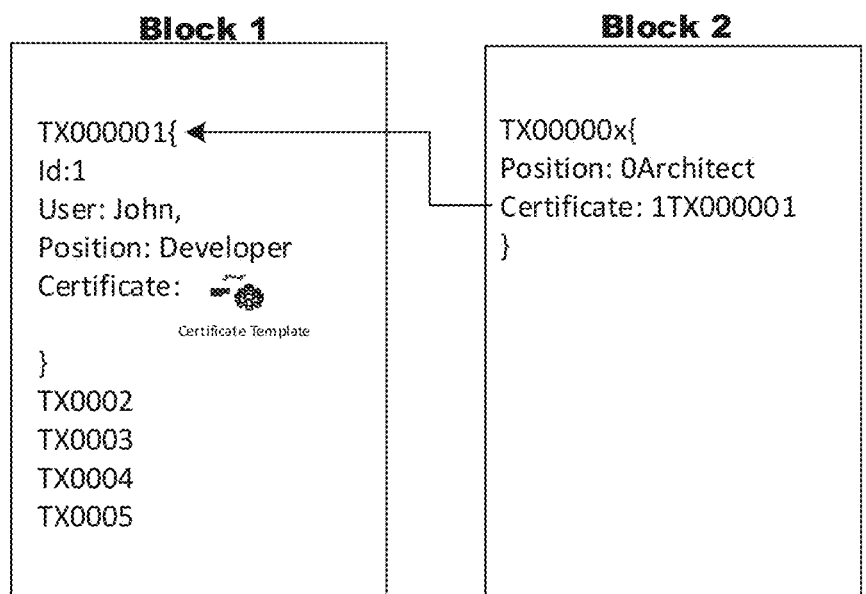
FIG. 1D illustrates an example of a block with second information that has replaced first information in accordance with one or more embodiments.

FIG. 1D shows an example of the first storage area 120 as Block 1 and the second storage area as Block 2 when a replacement operation in accordance with one or more embodiments described herein is performed. In this case, Block 1 has the first information. However, Block 2 as stored by manager 40 has stored the information received by receiver 10 with the first information (e.g., digital certificate) replaced with an identifier 75 in the form of transaction ID 1TX000001. The transactionID is only a fraction of the size of the digital certificate, and therefore the storage space occupied by Block 2 subject to the replacement operation is substantially less than the storage size of Block 2 (containing the digital certificate) when the replacement operation is not performed. This translates into a reduction in the size of the blockchain ledger at least with respect to Block 2.

In one embodiment, the extractor 20, correlator 30, artificial intelligence manager 35, and/or the manager 40 may be implemented by one or more processors executing instructions stored in a memory for implementing the aforementioned operations. These features may also perform the operations of the method embodiments, as described in greater detail below.

Figure 2A:
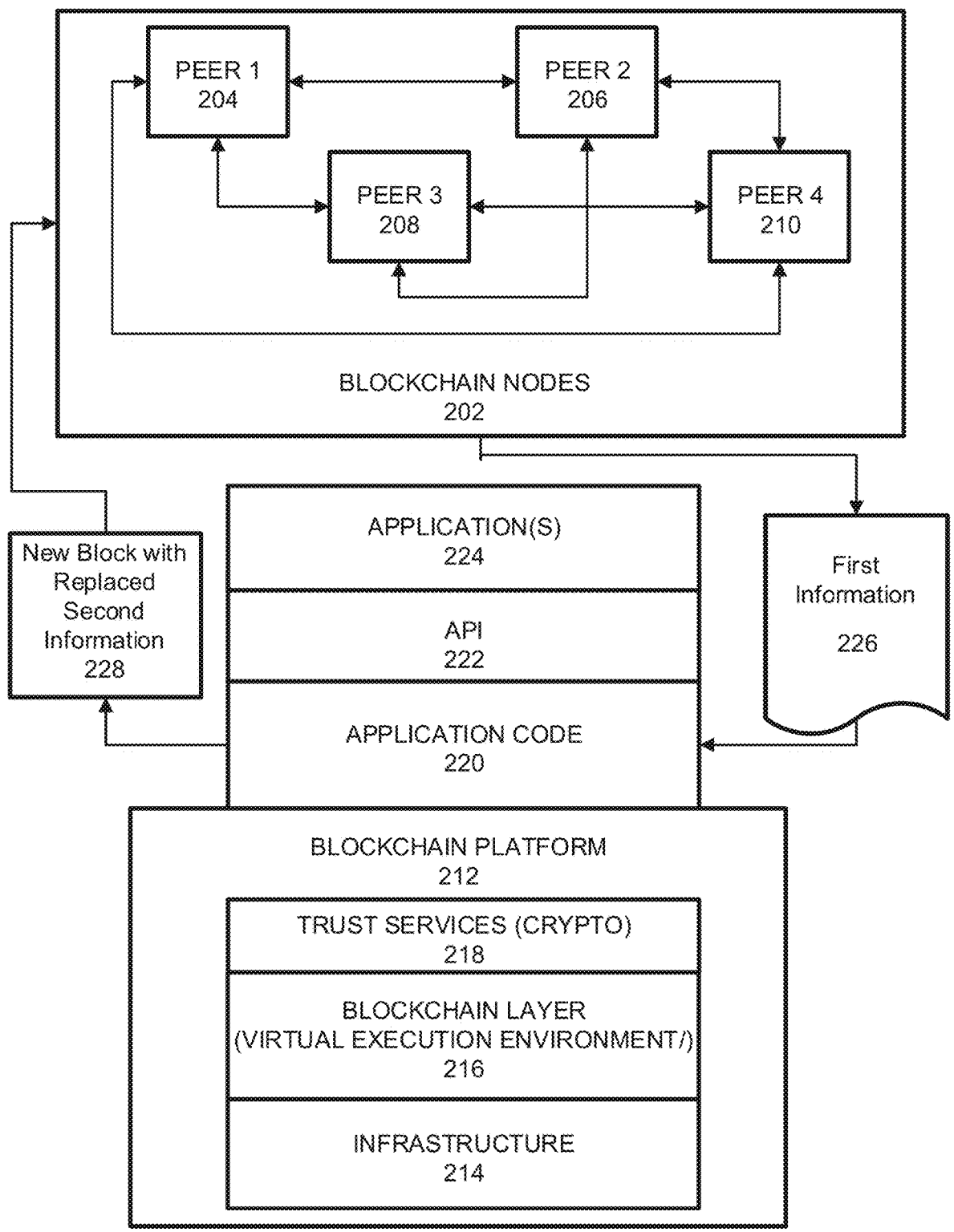
FIG. 2A illustrates an example blockchain architecture configuration, according to example embodiments.

FIG. 2A illustrates a blockchain architecture configuration 200, according to example embodiments. Referring to FIG. 2A, the blockchain architecture 200 may include certain blockchain elements, for example, a group of blockchain nodes 202. The blockchain nodes 202 may include one or more nodes 204-210 (these four nodes are depicted by example only). These nodes participate in a number of activities, such as blockchain transaction addition and validation process (consensus). One or more of the blockchain nodes 204-210 may endorse transactions based on endorsement policy and may provide an ordering service for all blockchain nodes in the architecture 200. A blockchain node may initiate a blockchain authentication and seek to write to a blockchain immutable ledger stored in blockchain layer 216, a copy of which may also be stored on the underpinning physical infrastructure 214. The blockchain configuration may include one or more applications 224 which are linked to application programming interfaces (APIs) 222 to access and execute stored program/application code 220 (e.g., chaincode, smart contracts, etc.) which can be created according to a customized configuration sought by participants and can maintain their own state, control their own assets, and receive external information. This can be deployed as a transaction and installed, via appending to the distributed ledger, on all blockchain nodes 204-210.

The blockchain base or platform 212 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 216 may expose an interface that provides access to the virtual execution environment necessary to process the program code and engage the physical infrastructure 214. Cryptographic trust services 218 may be used to verify transactions such as asset exchange transactions and keep information private.

The blockchain architecture configuration of FIG. 2A may process and execute program/application code 220 via one or more interfaces exposed, and services provided, by blockchain platform 212. The code 220 may control blockchain assets. For example, the code 220 can store and transfer data, and may be executed by nodes 204-210 in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger. For example, the information 226 may include the first information previously described, e.g., the recurring information that may be replaced with the identifier, pointer, or other type of second information as described herein. The information 226 may be processed by one or more processing entities (e.g., virtual machines) included in the blockchain layer 216. The result 228 may include information to be included in a new block of the blockchain which has been subject to the replacement operation, e.g., the first information has been replaced with the second information to be stored in a new block. The physical infrastructure 214 may be utilized to retrieve any of the data or information described herein.

A smart contract may be created via a high-level application and programming language, and then written to a block in the blockchain. The smart contract may include executable code which is registered, stored, and/or replicated with a blockchain (e.g., distributed network of blockchain peers). A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details.

Figure 2B:
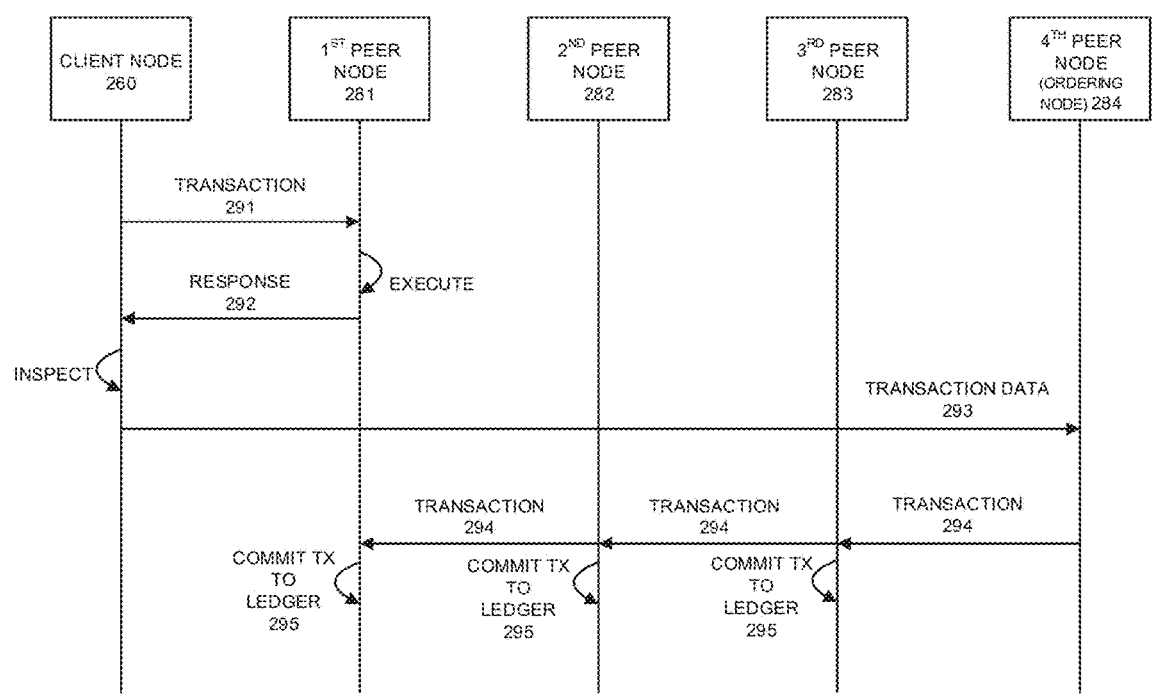
FIG. 2B illustrates a blockchain transactional flow, according to example embodiments.

FIG. 2B illustrates an example of a blockchain transactional flow 250 between nodes of the blockchain in accordance with an example embodiment. Referring to FIG. 2B, the transaction flow may include a transaction proposal 291 sent by an application client node 260 to an endorsing peer node 281. The endorsing peer 281 may verify the client signature and execute a chaincode function to initiate the transaction. The output may include the chaincode results, a set of key/value versions that were read in the chaincode (read set), and the set of keys/values that were written in chaincode (write set). The proposal response 292 is sent back to the client 260 along with an endorsement signature, if approved. The client 260 assembles the endorsements into a transaction payload 293 and broadcasts it to an ordering service node 284. The ordering service node 284 then delivers ordered transactions as blocks to all peers 281-283 on a channel. Before committal to the blockchain, each peer 281-283 may validate the transaction. For example, the peers may check the endorsement policy to ensure that the correct allotment of the specified peers have signed the results and authenticated the signatures against the transaction payload 293.

Referring again to FIG. 2B, the client node 260 initiates the transaction 291 by constructing and sending a request to the peer node 281, which is an endorser. The client 260 may include an application leveraging a supported software development kit (SDK), which utilizes an available API to generate a transaction proposal. The proposal is a request to invoke a chaincode function so that data can be read and/or written to the ledger (i.e., write new key value pairs for the assets). The SDK may serve as a shim to package the transaction proposal into a properly architected format (e.g., protocol buffer over a remote procedure call (RPC)) and take the client's cryptographic credentials to produce a unique signature for the transaction proposal.

In response, the endorsing peer node 281 may verify (a) that the transaction proposal is well formed, (b) the transaction has not been submitted already in the past (replay-attack protection), (c) the signature is valid, and (d) that the submitter (client 260, in the example) is properly authorized to perform the proposed operation on that channel. The endorsing peer node 281 may take the transaction proposal inputs as arguments to the invoked chaincode function. The chaincode is then executed against a current state database to produce transaction results including a response value, read set, and write set. However, no updates are made to the ledger at this point. In 292, the set of values, along with the endorsing peer node's 281 signature is passed back as a proposal response 292 to the SDK of the client 260 which parses the payload for the application to consume.

In response, the application of the client 260 inspects/verifies the endorsing peers signatures and compares the proposal responses to determine if the proposal response is the same. If the chaincode only queried the ledger, the application would inspect the query response and would typically not submit the transaction to the ordering node service 284. If the client application intends to submit the transaction to the ordering node service 284 to update the ledger, the application determines if the specified endorsement policy has been fulfilled before submitting (i.e., did all peer nodes necessary for the transaction endorse the transaction). Here, the client may include only one of multiple parties to the transaction. In this case, each client may have their own endorsing node, and each endorsing node will need to endorse the transaction. The architecture is such that even if an application selects not to inspect responses or otherwise forwards an unendorsed transaction, the endorsement policy will still be enforced by peers and upheld at the commit validation phase.

After successful inspection, in step 293 the client 260 assembles endorsements into a transaction and broadcasts the transaction proposal and response within a transaction message to the ordering node 284. The transaction may contain the read/write sets, the endorsing peers signatures and a channel ID. The ordering node 284 does not need to inspect the entire content of a transaction in order to perform its operation, instead the ordering node 284 may simply receive transactions from all channels in the network, order them chronologically by channel, and create blocks of transactions per channel.

The blocks of the transaction are delivered from the ordering node 284 to all peer nodes 281-283 on the channel. The transactions 294 within the block are validated to ensure any endorsement policy is fulfilled and to ensure that there have been no changes to ledger state for read set variables since the read set was generated by the transaction execution. Transactions in the block are tagged as being valid or invalid. Furthermore, in step 295 each peer node 281-283 appends the block to the channel's chain, and for each valid transaction the write sets are committed to current state database. An event is emitted, to notify the client application that the transaction (invocation) has been immutably appended to the chain, as well as to notify whether the transaction was validated or invalidated.

Figure 3A:
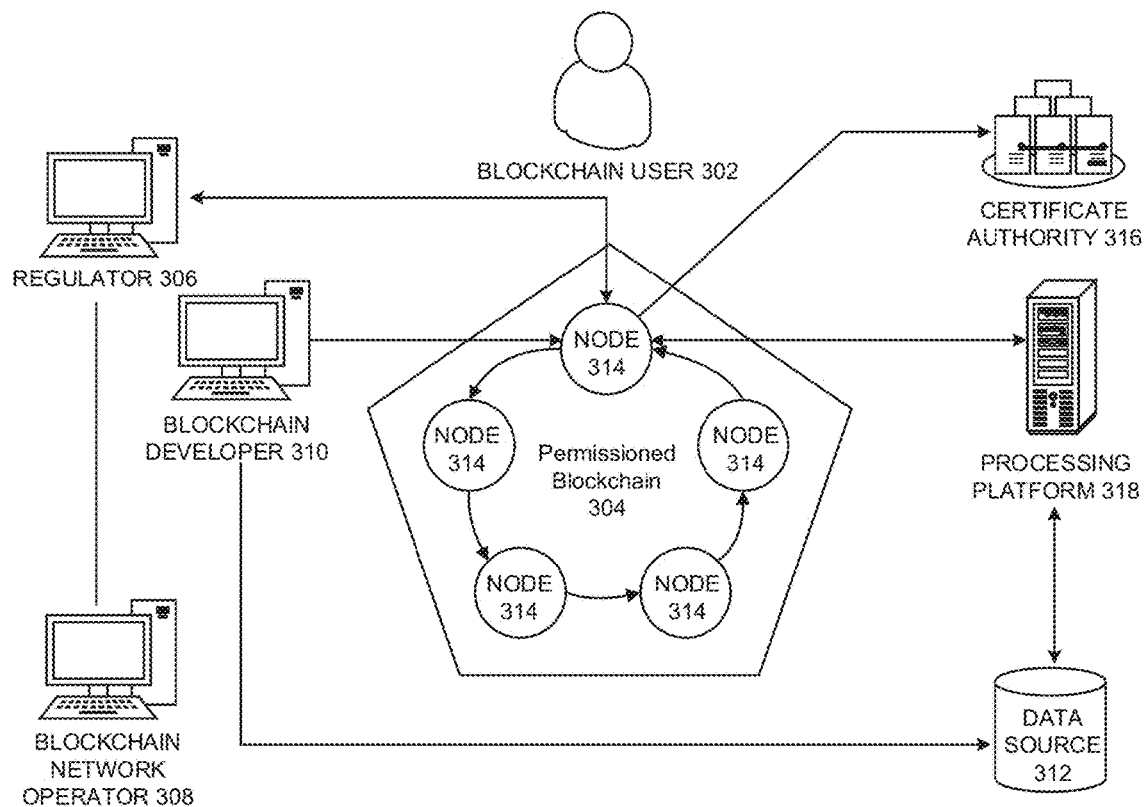
FIG. 3A illustrates a permissioned network, according to example embodiments.

FIG. 3A illustrates an example of a permissioned blockchain network 300, which features a distributed, decentralized peer-to-peer architecture. In this example, a blockchain user 302 may initiate a transaction to the permissioned blockchain 304. In this example, the transaction can be a deploy, invoke, or query, and may be issued through a client-side application leveraging an SDK, directly through an API, etc. Networks may provide access to a regulator 306, such as an auditor. A blockchain network operator 308 manages member permissions, such as enrolling the regulator 306 as an "auditor" and the blockchain user 302 as a "client". An auditor could be restricted only to querying the ledger whereas a client could be authorized to deploy, invoke, and query certain types of chaincode.

A blockchain developer 310 can write chaincode and client-side applications. The blockchain developer 310 can deploy chaincode directly to the network through an interface. To include credentials from a traditional data source 312 in chaincode, the developer 310 could use an out-of-band connection to access the data. In this example, the blockchain user 302 connects to the permissioned blockchain 304 through a peer node 314. Before proceeding with any transactions, the peer node 314 retrieves the user's enrollment and transaction certificates from a certificate authority 316, which manages user roles and permissions. In some cases, blockchain users must possess these digital certificates in order to transact on the permissioned blockchain 304. Meanwhile, a user attempting to utilize chaincode may be required to verify their credentials on the traditional data source 312. To confirm the user's authorization, chaincode can use an out-of-band connection to this data through a traditional processing platform 318.

Figure 3B:
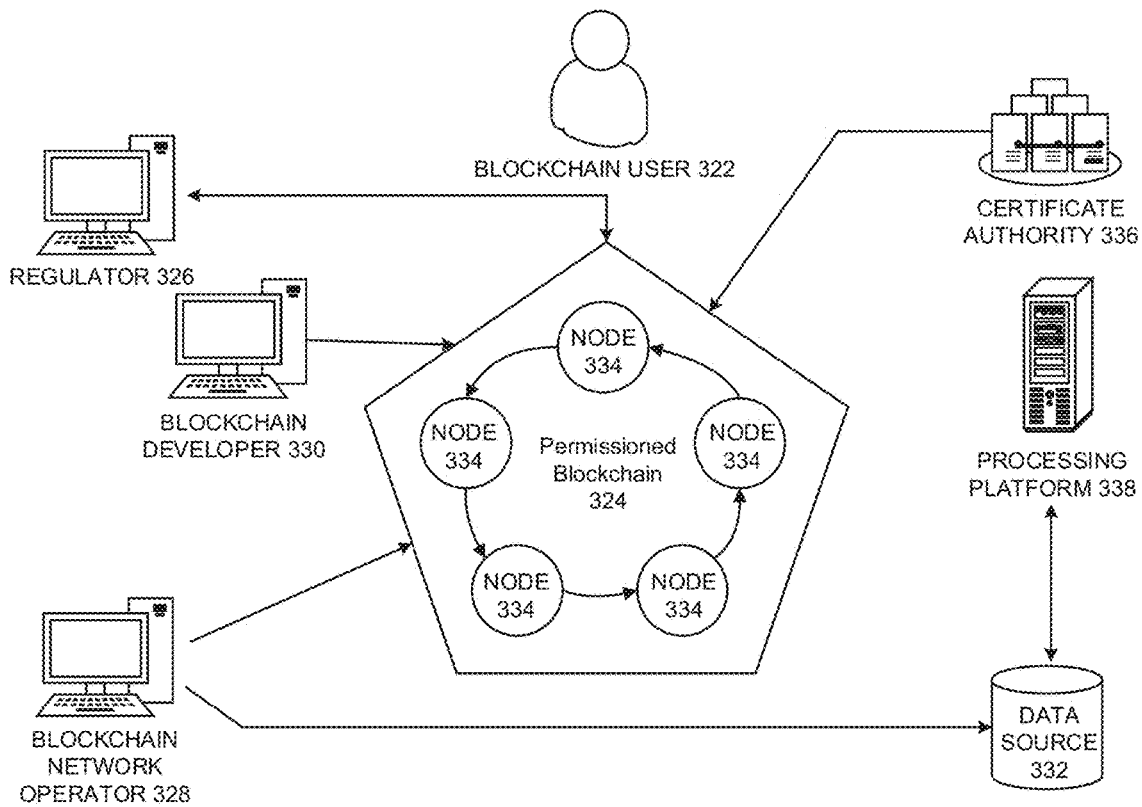
FIG. 3B illustrates another permissioned network, according to example embodiments.

FIG. 3B illustrates another example of a permissioned blockchain network 320, which features a distributed, decentralized peer-to-peer architecture. In this example, a blockchain user 322 may submit a transaction to the permissioned blockchain 324. In this example, the transaction can be a deploy, invoke, or query, and may be issued through a client-side application leveraging an SDK, directly through an API, etc. Networks may provide access to a regulator 326, such as an auditor. A blockchain network operator 328 manages member permissions, such as enrolling the regulator 326 as an "auditor" and the blockchain user 322 as a "client". An auditor could be restricted only to querying the ledger whereas a client could be authorized to deploy, invoke, and query certain types of chaincode.

A blockchain developer 330 writes chaincode and client-side applications. The blockchain developer 330 can deploy chaincode directly to the network through an interface. To include credentials from a traditional data source 332 in chaincode, the developer 330 could use an out-of-band connection to access the data. In this example, the blockchain user 322 connects to the network through a peer node 334. Before proceeding with any transactions, the peer node 334 retrieves the user's enrollment and transaction certificates from the certificate authority 336. In some cases, blockchain users must possess these digital certificates in order to transact on the permissioned blockchain 324. Meanwhile, a user attempting to utilize chaincode may be required to verify their credentials on the traditional data source 332. To confirm the user's authorization, chaincode can use an out-of-band connection to this data through a traditional processing platform 338.

In some embodiments, the blockchain herein may be a permissionless blockchain. In contrast with permissioned blockchains which require permission to join, anyone can join a permissionless blockchain. For example, to join a permissionless blockchain a user may create a personal address and begin interacting with the network, by submitting transactions, and hence adding entries to the ledger. Additionally, all parties have the choice of running a node on the system and employing the mining protocols to help verify transactions.

Figure 3C:
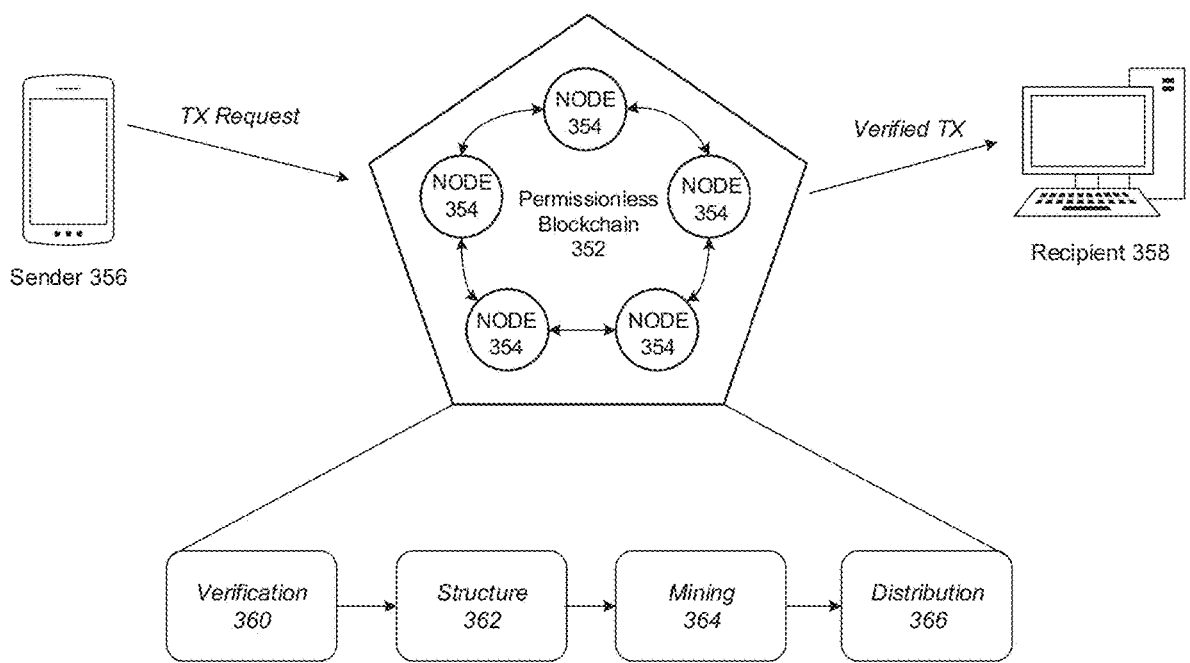
FIG. 3C illustrates a permissionless network, according to example embodiments.

FIG. 3C illustrates a process 350 of a transaction being processed by a permissionless blockchain 352 including a plurality of nodes 354. A sender 356 desires to send payment or some other form of value (e.g., a deed, medical records, a contract, a good, a service, or any other asset that can be encapsulated in a digital record) to a recipient 358 via the permissionless blockchain 352. In one embodiment, each of the sender device 356 and the recipient device 358 may have digital wallets (associated with the blockchain 352) that provide user interface controls and a display of transaction parameters. In response, the transaction is broadcast throughout the blockchain 352 to the nodes 354. Depending on the blockchain's 352 network parameters the nodes verify 360 the transaction based on rules (which may be pre-defined or dynamically allocated) established by the permissionless blockchain 352 creators. For example, this may include verifying identities of the parties involved, etc. The transaction may be verified immediately or it may be placed in a queue with other transactions and the nodes 354 determine if the transactions are valid based on a set of network rules.

In structure 362, valid transactions are formed into a block and sealed with a lock (hash). This process may be performed by mining nodes among the nodes 354. Mining nodes may utilize additional software specifically for mining and creating blocks for the permissionless blockchain 352. Each block may be identified by a hash (e.g., 256 bit number, etc.) created using an algorithm agreed upon by the network. Each block may include a header, a pointer or reference to a hash of a previous block's header in the chain, and a group of valid transactions. The reference to the previous block's hash is associated with the creation of the secure independent chain of blocks.

Before blocks can be added to the blockchain, the blocks must be validated. Validation for the permissionless blockchain 352 may include a proof-of-work (PoW) which is a solution to a puzzle derived from the block's header. Although not shown in the example of FIG. 3C, another process for validating a block is proof-of-stake. Unlike the proof-of-work, where the algorithm rewards miners who solve mathematical problems, with the proof of stake, a creator of a new block is chosen in a deterministic way, depending on its wealth, also defined as "stake." Then, a similar proof is performed by the selected/chosen node.

With mining 364, nodes try to solve the block by making incremental changes to one variable until the solution satisfies a network-wide target. This creates the PoW thereby ensuring correct answers. In other words, a potential solution must prove that computing resources were drained in solving the problem. In some types of permissionless blockchains, miners may be rewarded with value (e.g., coins, etc.) for correctly mining a block.

Here, the PoW process, alongside the chaining of blocks, makes modifications of the blockchain extremely difficult, as an attacker must modify all subsequent blocks in order for the modifications of one block to be accepted. Furthermore, as new blocks are mined, the difficulty of modifying a block increases, and the number of subsequent blocks increases. With distribution 366, the successfully validated block is distributed through the permissionless blockchain 352 and all nodes 354 add the block to a majority chain which is the permissionless blockchain's 352 auditable ledger. Furthermore, the value in the transaction submitted by the sender 356 is deposited or otherwise transferred to the digital wallet of the recipient device 358.

Figure 4:
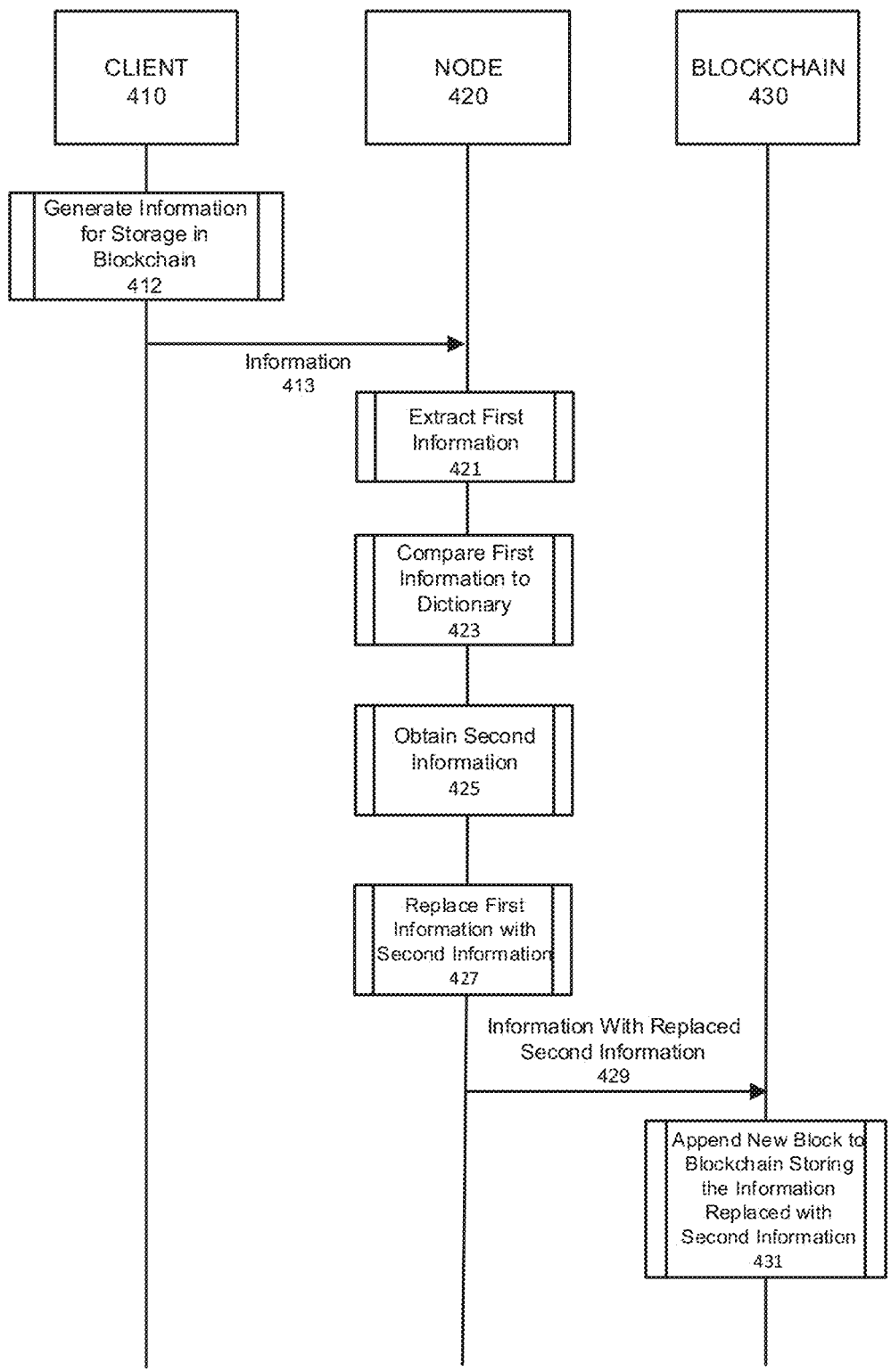
FIG. 4 illustrates a system messaging diagram, according to example embodiments.

FIG. 4 illustrates an embodiment of a system messaging diagram 400 for performing operations included in one or more of the system and method described herein. By way of example, the messaging and its attendant operations are performed by three entities: client 410, node 420, and a blockchain 430. The messaging and operations may be performed by one or more different entities in another embodiment.

Referring to FIG. 4, the system diagram 400 includes client 410 generating information that is to be stored in a new block of a blockchain 412. The information includes the first information as previously described, e.g., digital certificates, digital media, or other forms of information that otherwise may be stored on a recurring basis in the blockchain. Once the information has been generated, the information 413 is sent to node 420.

The node 420 extracts, at 421, the first information from the information 413 received from the client 410. This operation may be performed by the extractor previously discussed. The first information is then compared to the dictionary, at 423, in order to determine whether the first information has been stored in one or more previous blocks of the blockchain, e.g., whether the first information constitutes recurring information. This operation may be performed by the correlator as previously indicated, with the assistance of the artificial intelligence manager.

When the first information is determined to exist in the dictionary (e.g., when the first information is determined to be recurring information), then, at 425, second information corresponding to the first information is obtained from the dictionary. For example, information indicative of a storage area (e.g., a prior block) in the blockchain that has already stored the first information is obtained as the second information. The second information may include, for example, a pointer or identifier referencing the storage area. In one embodiment, the pointer or identifier may be a transactionID corresponding to a transaction containing the first information stored in the storage area.

Once the second information has been obtained, the node 420 performs an operation, at 427, which includes replacing the first information with the second information. The information 413 received from the client is then sent to the blockchain 430 with the second information in place of the first information, which is indicated by information 429. A new block containing information 429 is then stored in the blockchain. Because information 429 includes the second information which has been inserted in place of the first information, the first information may be recovered when information 429 is accessed in a subsequent blockchain query. Append new block to blockchain, storing the information replaced with the second information 431.

Figure 5A:
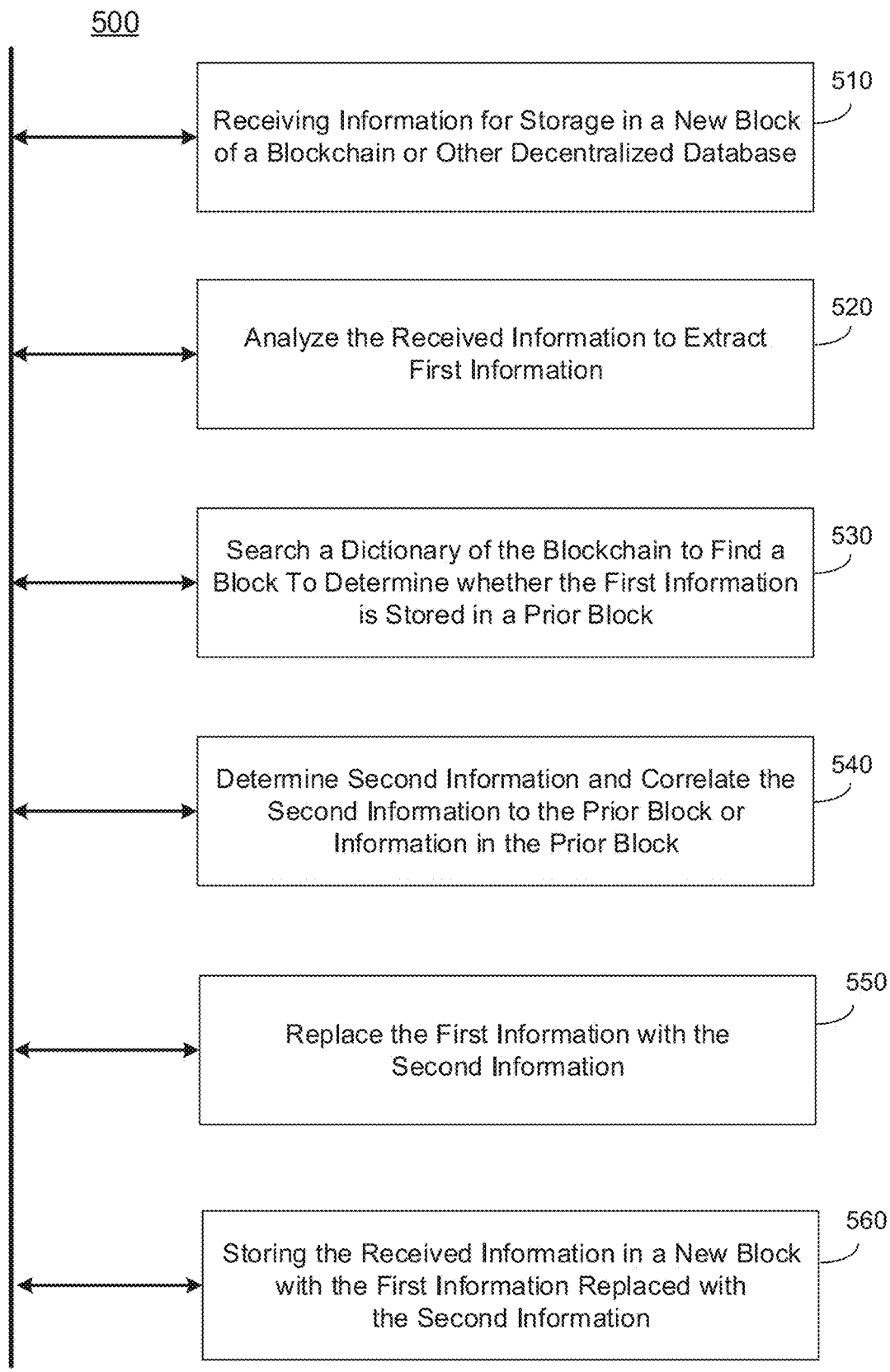
FIG. 5A illustrates a flow diagram, according to example embodiments.

FIG. 5A illustrates a flow diagram 500 for managing storage space in a decentralized database (e.g., a blockchain) according to example embodiments. The method may be performed by the system and other embodiments described herein or may be performed by a different system and/or associated network entities. For illustrative purposes, the decentralized database will be discussed as a blockchain.

Referring to FIG. 5A, the method 500 may include, at 510, receiving information to be stored in the blockchain. This operation may be performed by the receiver 10 as previously described. The information may correspond, for example, to a transaction received for storage in a new block to be appended to a blockchain. The transaction may be received, for example, by a node (e.g., a peer node) in the blockchain network from a client participating in the network. The transaction may relate to any information that is to be recorded in the blockchain, including but not limited to, various types of financial or cryptocurrency-based transactions. In one embodiment, the information may not relate to a financial transaction, but may nevertheless be referred to as a transaction. For example, the information may include any type of information or data (e.g., as described herein) that is to be stored for later retrieval or otherwise. For purposes of discussion, an example is discussed below involving weather-related data.

At 520, the received information is analyzed to extract first information that may be recurring or repeatedly stored in the decentralized database, e.g., information that may have been previously stored in one or more storage areas of the database prior to receiving the information to be stored in operation 510. This operation may be performed by the extractor 20 as previously described. The first information may be, for example, a predetermined type of information and/or information that is of a kind likely considered to be of excessive length, such that repeatedly storing the same information in different storage areas of the database would increase the overall storage requirements of the database and its corresponding ledger to be stored by various nodes within the database network.

Examples of the predetermined types or kinds of information that may correspond to the first information include, but are not limited to, digital certificates, various forms of media data (e.g., scanned documents, images, video, etc.), values of asset properties associated with transactions to be recorded, and/or other types of information. This information may be included, for example, in one or more predetermined fields or sections of the received information in order to allow for expedited or efficient extraction from the received information. In one embodiment, the extractor 20 may include logic that searches the received information (e.g., based on one or more predetermined fields, keywords, extensions, or associated data types) that allow for identification and extraction of the first information from the received information.

At 530, all or a portion of the storage areas of the database may be searched in order to locate a storage area that stores the first information that was extracted in operation 520. When the decentralized database is a blockchain, the one or more storage areas may be a prior block in the blockchain storing the first information. The search in operation 530 may be performed based on a dictionary, for example, as described in greater detail below. In one embodiment, the search may be performed without using a dictionary, for example, based on a search of the ledger.

At 540, when a storage area storing the first information has been found by the search, second information may be accessed and correlated to the prior block or information in the prior block (e.g., a transaction). These operations may be performed, for example, by the correlator 30 of the system with reference to the dictionary described below. In one embodiment, the second information may correlate the first information (as received in operation 510) to the earliest or first-occurring block in the blockchain that is found to store the first information, as determined by the search. In one embodiment, the second information may correlate the first information to any block (e.g., a block that is not the first block) that has been found by the search to store the first information. This latter situation may be applied when, for example, a threshold is used as a basis for determining whether first information constitutes recurring information in the blockchain. For example, there may be instances where only one prior occurrence of the first information in the blockchain is not sufficient to qualify as recurring information. In such a case, the search may be required to determine whether the first information occurs a threshold number of times or more before the first information is deemed to qualify as recurring information. In such a case, the second information may point to any prior block storing the first information which may not be the first prior block.

The second information may be different from the first information and substantially smaller in size (e.g., substantially fewer bits) than the first information. Also, in one embodiment, the second information may include an identifier that links to the storage area (e.g., the first storage area (but not necessarily the first-occurring storage area previously described for FIG. 1A) found by the search, for example, in order to allow for recovery of the first information when a query of the blockchain produces the new block to be recorded. In one example implementation, the first storage area may be a previous or existing block in the blockchain and the second information may be an identifier or pointer to information stored in the previous block or to the block itself, e.g., in one embodiment the identifier or pointer may identify a transaction (e.g., transactionID) stored in the previous block. The second information, in the form of the transactionID, may therefore be used as a basis for linking information in the new block to the previous block, so that the first information (e.g., digital certificate, media data, or any other type of recurring information) linked by the second information may be retrieved during a subsequent query.

The aforementioned correlation operations may be accomplished, for example, using a dictionary as described herein. The dictionary may be previously generated by one or more processors in the decentralized database network. The one or more processors may be associated with a node (e.g., a blockchain peer node) of the database network, an authority or administrator of the database network, or another entity of or coupled to the network, for example, as described herein. In one embodiment, the dictionary may be included with or related to the ledger (e.g., world state) maintained by the database network nodes or may be stored in storage area external to or coupled to a database node, client, or other entity.

In one embodiment, the dictionary may be generated to store a plurality of second information (identifiers) linking different first information to different storage areas (e.g., blocks or transactions in the blocks) of the blockchain. The plurality of identifiers may include an identifier linking the first information extracted in operation 520 to a prior block of the blockchain identified by the search. The dictionary may store the different information as is or as a derived value. For example, when the first information corresponds to a digital certificate, the dictionary may generate and store a derived value in the form of a hashed value of the digital certificate in correspondence with an identifier included as the second information in the dictionary. The identifier may be, for example, the transactionID of a transaction stored in the prior block, which transaction includes the digital certificate. In another embodiment, the identifier may be another type of pointer which points to the prior block (e.g., an address or number of the prior block or entry in the prior block) storing the digital certificate. Thus, the identifier corresponding to the second information serves to link the first information (e.g., digital certificate) in the dictionary to a prior block or information stored in the prior block corresponding to the digital certificate.

At 550, once the second information has been correlated to the first storage area (e.g., by performing a dictionary search), a replacement operation may be performed which involves replacing the first information with the second information. The replacement operation may involve, for example, modifying the information received by receiver 10 to include the second information in place of the first information. In one embodiment, the replacement operation may involve providing instructions to the manager 40 store the received information with the second information instead of the first information.

At 560, the information received at operation 510 may be stored in a new storage area of the database (e.g., new block of a blockchain) in a form where the first information has been replaced with the second information. This operation may be performed by a manager 40 as previously described, which, for example, may be located in the same node that received in the information in operation 500 or another node or entity in the blockchain network. Because the second information (e.g., transactionID) is substantially smaller in size than the digital certificate, the replacement operation allows the size of the information stored in the new block to be substantially smaller than it otherwise would have been if the digital certificate were redundantly stored in the new block.

Thus, in accordance with one or more embodiments, the method may be implemented to detect repeated or recurring information (e.g., first information) in a blockchain and then access second information (e.g., an identifier in a dictionary) that links, references, or points to information stored in a prior block that includes the first information. A new block may then be stored with the second information in place of the first information, in order to achieve a reduction in the storage requirements of new blocks containing recurring or repeatedly stored information. In one embodiment, the dictionary may serve as an auxiliary part of the ledger (or world state).

Figure 5B:
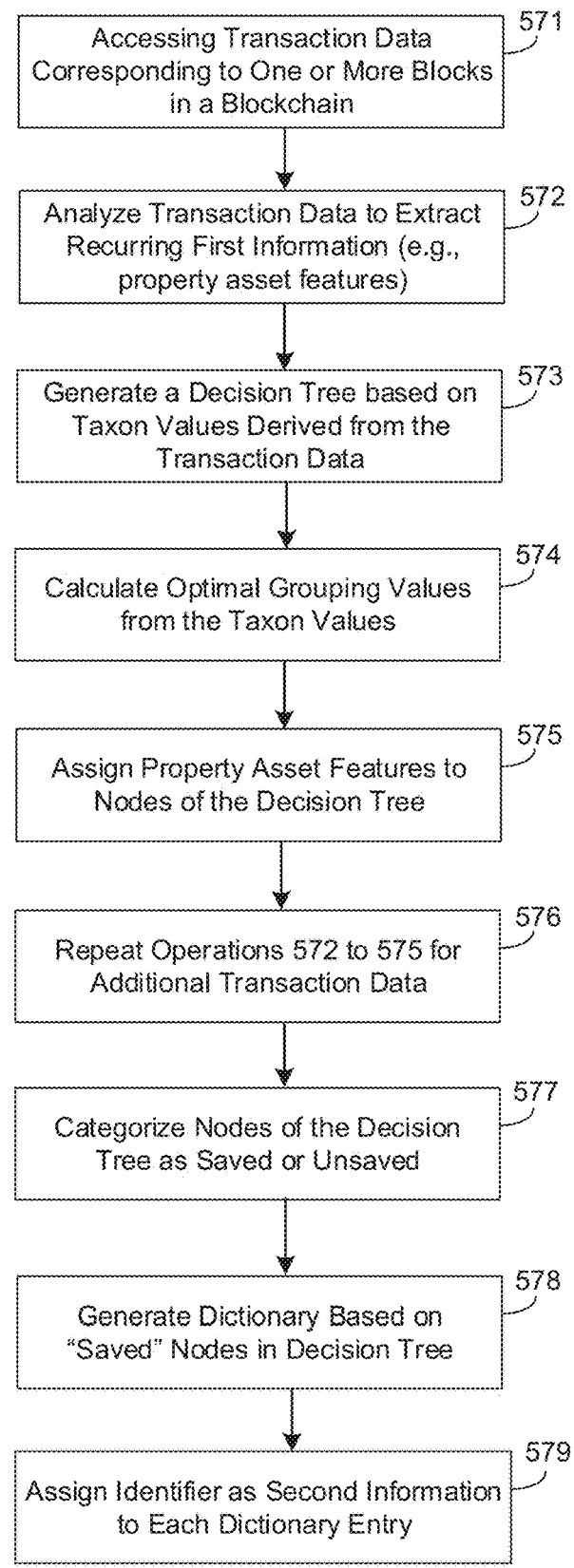
FIG. 5B illustrates a further flow diagram, according to example embodiments.

FIG. 5B illustrates a flow diagram 570 corresponding to an embodiment of a method for generating a dictionary as previously described. The dictionary may be generated and managed by a network entity (e.g., node, authority, administrator, etc.) based on an artificial intelligence manager 35, programmed to implement a machine-learning algorithm that creates, updates, and retrieves information from the dictionary. The dictionary may then be updated on a continual or periodic basis based on data, asset property values, transactions, or other types of first information in correspondence with second information. In the following example, the second information will be discussed as including one or more transactionIDs.

Referring to FIG. 5B, generation of the dictionary may initially include, at 571, by accessing transaction data corresponding to one or more blocks recorded in a blockchain ledger. The transaction data may be accessed in predetermined increments or chunks, e.g., one transaction at a time or multiple transactions or blocks (chunks) of transactions at a time. All of the transactions recorded on the ledger may be accessed and analyzed for purposes of generating or updating the dictionary. In one embodiment, only a predetermined number of transactions (e.g., a latest number of transactions) may be accessed for this purpose.

At 572, the transaction data is analyzed to identify and extract recurring instances of first information, which in this example may be referred to as property asset features. The analysis may be performed and the dictionary generated, for example, by one or more processors executing instructions corresponding to an unsupervised machine-learning algorithm. In one embodiment, and for purposes of describing the present example, the information extracted from the transaction data (e.g., property asset features) may be expressed in the form of <property, value> pairs. In other embodiments, the property asset values may be expressed in a different manner, e.g., a combination of tuples of values or data or as a singular value or data.

When the property asset features are expressed in the form of <property, value> pairs, the machine-learning algorithm may be used to generate a model that is trained with an initial set of <property, value> pairs derived from multiple transactions accessed in operation 571. In training the model, the algorithm may analyze the transaction data, first, to locate portions of the data that have discrete values and, second, to construct the property-value pairs to be used in generating a decision tree for the model. The discrete values may include, but are not limited to, digital signatures, scanned image values, or other values or information corresponding to one or more transaction data features. The discrete values may be used to generate the <property, value> pairs.

In the present example, the <property, value> pairs correspond to weather data. Accordingly, the model may be generated through implementation of the algorithm based on a training set of weather data. Example of the training data may correspond, for example, to the dataset indicated in the table 501 of FIG. 5C. In the example of FIG. 5C, each item of transaction data (property asset features) has four <property, value> pairs, with each <property, value> pair having a property that corresponds to one of weather outlook, temperature, humidity, and wind. The values associated with each property may differ from one another. For example, the values associated with the outlook property include sunny, overcast, and rainy. The values associated with the temperature property include cool, mild, and hot. The values associated with the humidity property include normal and high. The values associated with the wind property include binary values of true and false. The following is an example of <property, value> pairs that may be generated based on the dataset in FIG. 5C.

```
< Outlook , Sunny >
< Outlook , Overcast >
< Outlook , Rainy >
< Temp, Hot>
< Temp, Mild>
< Temp, Cool>
< Humidity , High>
< Windy , False >
```

An example of a JSON object associated with an example of the property asset features for one transaction recorded in the blockchain includes four <property, value> pairs as set forth below.

```
{
Outlook: sunny,
Temperature: hot,
Humidity: high,
Windy: false
}
```

At 573, once the property asset features have been analyzed to extract, or generate, <property, value> pairs, the decision tree may be generated. Each node or level in the decision tree may be assigned a different one of the <property, value> pairs. In one embodiment, this may involve calculating a taxon value for each of the <property, value> pairs based on Equation (1).

$$\lambda^i = \prod_{j=1}^{n} \frac{|V_j^i|}{|D_j|} \qquad (1)$$

where λ is the taxon value, i corresponds to the set of the taxon value (e.g., YES set or NO set), j corresponds to property in the transaction, n corresponds to total number of properties per transaction, $|V_j^i|$ corresponds to the number of values of appropriate subset $V_j^i$, and $|D_j|$ is the total number of discrete property values feature X for all objects (transactions) from a selected chunk of transactions.

At 574, once the taxon values have been calculated, optimal grouping may be performed by calculating an optimal group value equal to the summation of the taxon values calculated based on the <property, value> pairs. The optimal group value may be calculated based on Equation (2).

$$g = \Sigma_{i=1}^{L} \lambda^i \qquad (2)$$

where g corresponds to the optimal group value, i corresponds to predetermined set values (e.g., YES set, NO set for a given chunk of transaction data as explained below), L corresponds to number of sets/labels and in this cases will be two (saved/not saved), and $\lambda^i$ is the taxon value as determined in Equation (1).

Conceptually, Equations (1) and (2) may be applied in an iterative manner, which may involve comparing the property asset features extracted from the transaction data to each <property, value> pair of all the <property, value> pairs identified in the transaction data. For example, for the first <property, value> pair that is <Outlook, Sunny>, the transactions may be divided into two sets i, a YES set and a NO set. For each set, in the example under consideration, the comparison may produce the result that five data samples (transactions) from the dataset have the <property, value> pair of outlook=sunny, as shown in FIG. 5D. In this case, five data samples are included in a YES set which represents the samples which have sunny as the outlook value. From the data shown in table 502 of FIG. 5D, the outlook property has only one value in the YES set (sunny), out of the three possible values that it can take (namely sunny, overcast, and rainy).

Given this result, additional taxon values may be computed for the other three properties (temperature, humidity, wind) based on their corresponding values as indicated the dataset of FIG. 5D relative to the <property, value> pair of outlook=sunny. This results in an aggregate taxon value $\lambda^i$ for the YES set of the <property, value> pair of outlook=sunny indicated in FIG. 5D, where the aggregate taxon value $\lambda^i$ for this YES set may be calculated as follows:

$$\lambda^{Yes} = \prod_{j=1}^{n} \frac{|V_j^i|}{|D_j|} = \frac{1}{3} * \frac{3}{3} * \frac{2}{2} * \frac{2}{2} = 0.333$$

The fractional values in this equation may be understood as follows. The numerator may indicate the number of different values for a given property in the Yes set and the denominator may indicate the total number of possible values for a given property. Thus, for the outlook property, the first fractional value (⅓) may have a numerator of 1 because all of the property values in the Yes set of FIG. 5D are the same (sunny) and may have a denominator of 3 because there are three possible values for the property of outlook.

The second fractional value (3/3) may have a numerator of 3 because three different values of the property temperature appear in the Yes set of FIG. 5D (namely, cool, hot, mild) and may have a denominator of 3 because there are three possible values for the property of temperature.

The third fractional value (2/2) may have a numerator of 2 because two different values of the property humidity appear in the Yes set of FIG. 5D (namely, normal and high) and may have a denominator of 2 because there are two possible values for the property of humidity.

The fourth fractional value (2/2) may have a numerator of 2 because two different values of the property wind appear in the Yes set of FIG. 5D (namely, false and true) and may have a denominator of 2 because there are two possible values for the property of wind.

Once the grouping value for the YES set has been calculated, the grouping value for the NO set (e.g., outlook≠sunny) may be calculated based on the taxon values derived from the transaction data in the dataset. Equations (1) and (2) may be used to calculate the group value for the NO set in a manner analogous to the YES set. The group value for the NO set may be indicated below based on the transaction data in the dataset of FIG. 5D.

$$\lambda^{No} = \prod_{j=1}^{n} \frac{|V_j^i|}{|D_j|} = \frac{2}{3} * \frac{2}{2} = 0.667$$

The first fractional value (⅔) may have a numerator of 2 because two of the values of property outlook (namely, overcast and sunny) do not appear in the dataset of FIG. 5D and may have a denominator of 3 because there are three possible values of the property outlook.

The second fractional value (2/2) may have numerator of 2 because of the two values of property windy (True and False) and may have denominator of 2 because there are two possible values of property windy. The other two fractional values are (2/2) for the property humidity and (3/3) for the property temperature, which will give 1 as the result of multiplication so only one fraction value of windy is stated in the above equation for illustration)

Once the taxon value for the YES set and the taxon value for the NO set have been calculated, the value for the optimal grouping may be calculated based on the summation of the taxon values for the YES and NO sets, as indicated below which is an expanded version of Equation (2):

$$g = \Sigma_{i=1}^{L} \lambda^i = \lambda^{Yes} + \lambda^{No} = 0.333 + 0.667 = 1$$

Figures 5E, 5F:
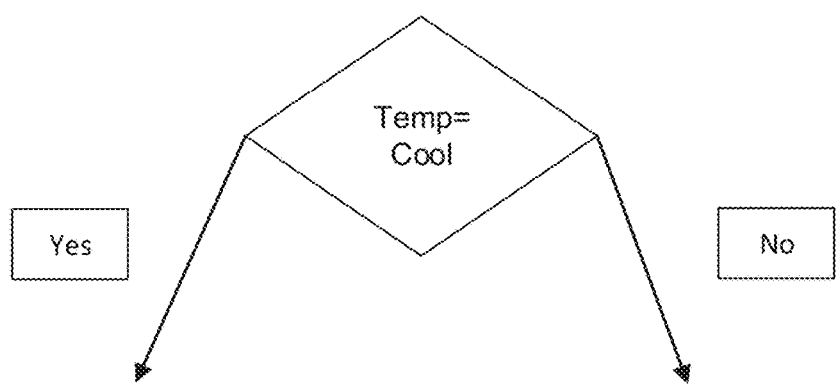
FIG. 5E illustrates an example of group values generated for the data set.
FIG. 5F illustrates an example of a node generated for a decision tree.

At 575, one of the <property, value> pairs of the dataset are assigned to a current level or node of the decision tree. In one embodiment, this may be performed based on the smallest value of the optimal grouping generated for the dataset in FIG. 5D, which is the <Temperature, Cool> pair. Thus, based on implementation of the machine-learning program the <Temperature, Cool> pair is assigned at the current level (e.g., level 0) of the decision tree. An example of the first level of the decision tree 504 is shown in FIG. 5F, with YES and NO branches.

Calculation of the taxon values and group values may be performed for remaining ones of the properties in the initial chunk of transaction data. This may involve performing the same calculations to all the <property, value> pairs in the chunk of transaction data in the dataset to give the results 503 shown in FIG. 5E. If additional chunks of transaction data are in the training data, the aforementioned operations may be repeated for those additional chunks.

Figure 5G:
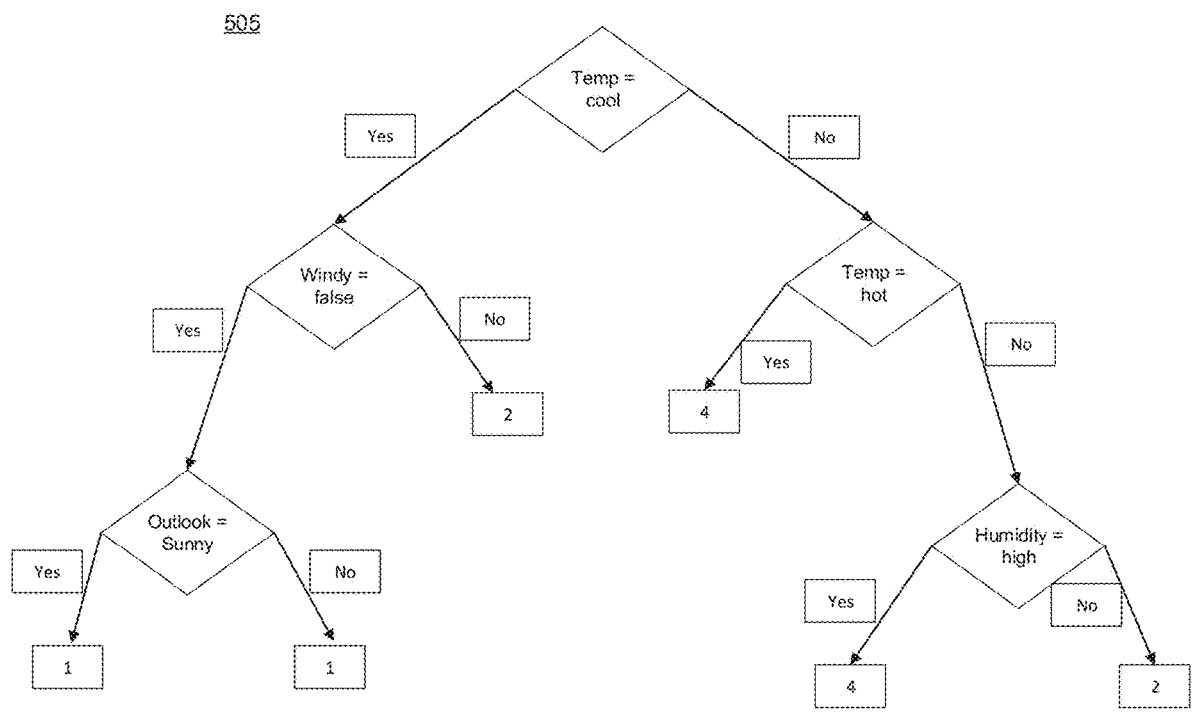
FIG. 5G illustrates an example of additional nodes generated for the decision tree.

At 576, once the <property, value> pair is assigned to the decision tree in operation 575, a check is performed as to whether all <property, value> pairs that have been extracted from the transaction data have been considered. If all <property, value> pairs have not been considered, then the method returns to operation 572 and the method is repeated for the remaining <property, value> pairs, the result of which is to add additional nodes to the decision tree at various levels of the tree. FIG. 5G shows an example of the decision tree 505 generated when all <property, value> pairs have been considered for purposes of generating nodes of the tree at various levels. In this example, the decision three has three levels.

At 577, when all (or a predetermined number of) <property, value> pairs have been considered, the nodes (e.g., "leaves") of the decision tree are categorized as either "saved" or "unsaved." This categorization may be performed, for example, based on the number of occurrences of clusters corresponding to the nodes. In one embodiment, a cluster may be considered to be a grouping of the number of times the corresponding node was generated when additional chunks of transaction data are received as used to train the model. For example, after the first chunk is considered, a number of nodes are generated for the decision tree. When a second chunk of transaction data is considered, a second set of nodes for the decision tree may be generated, some of which may be the same as some of the nodes generated for the tree based on the first chunk of data. As more and more chunks of transaction data are processes by the algorithm, each node may have multiple occurrences, for clusters, which may be taken into consideration when generating the dictionary to be used in replacing the second information with the first information, as in the method of FIG. 5A

Figure 5H:
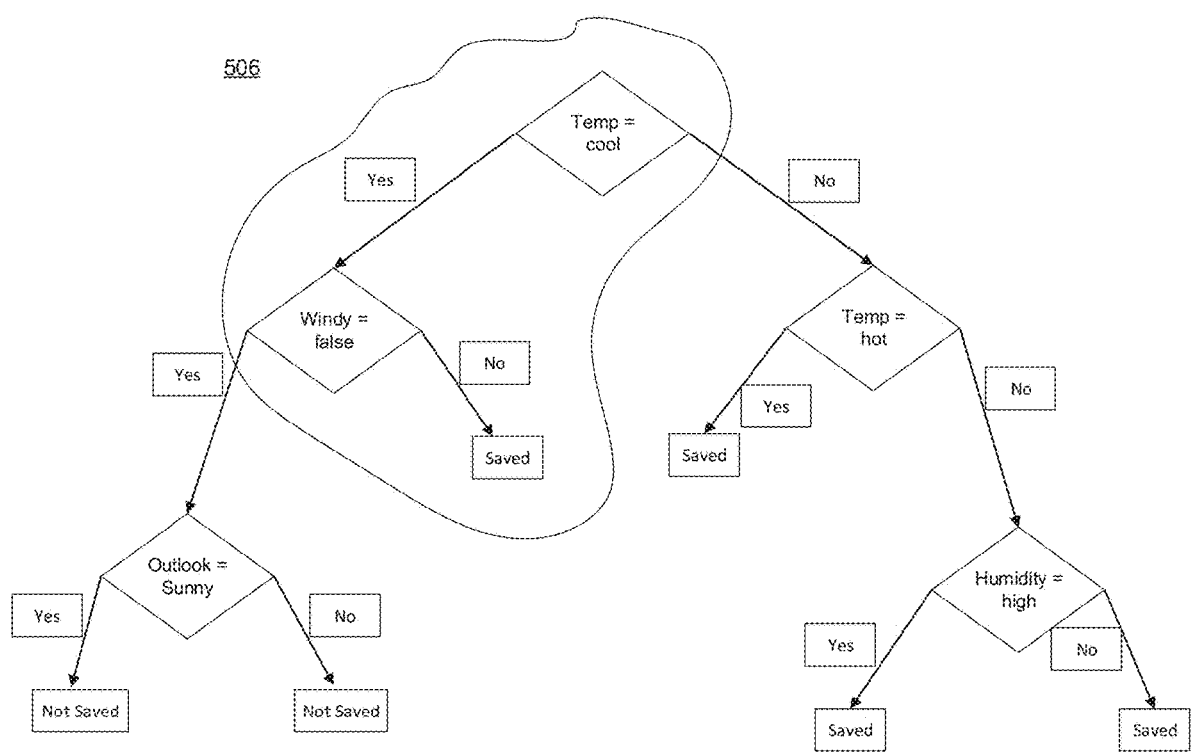
FIG. 5H illustrates an example of a logical association of nodes of the decision tree linked to a dictionary.

By way of example, when viewed from left to right, the decision tree shown in FIG. 5G has six clusters of one, one, two, four, four, two data samples (or occurrences) corresponding to the three levels of nodes. The clusters having occurrences (e.g., which may be based on the number of transactions) that are equal to or greater than a predetermined threshold value may be labelled as "saved." The clusters that have fewer occurrences (ones having only on occurrence each) are labelled as "not saved." FIG. 5H shows an example of the decision tree 506 with the labels of "saved" and "unsaved."

At 578, the dictionary is created based on the clusters in the decision tree that have been labelled as "saved." This may involve saving the values along the path of the candidate nodes (leaves) in the decision tree marked as "saved" as a linked-list entry in the dictionary. The result is to generate a two-dimensional matrix of linked lists.

At 579, each node in the linked list (and thus each node in the decision tree and its corresponding item in the dictionary) may be assigned a reference (e.g., an identifier, pointer, etc.) pointing to a transaction in a prior block of the blockchain indicative of an occurrence (e.g., first occurrence) of a corresponding value for a property in the ledger. In one embodiment, the first occurrence may be designated, for example, as the initial storage area in the blockchain leger that corresponds to a respective one of the <property, value> pairs of "saved" clusters in the decision tree. The initial storage areas may be indicated, for example, by a transactionID.

After the dictionary has been generated, it may be used to perform blockchain queries. For example, the blockchain may be queried to locate the block and thus the dictionary entry (corresponding to a relevant one or more decision tree nodes) corresponding to the transactionIDs. The transaction information corresponding to the transactionID may correspond to the first information (e.g., digital certificate, digital media, etc.) that has found to be recurring in the blockchain. The transactionID (or other form of identifier or pointer) may correspond to the second information and may be used to replace the first information to reduce the size of the blockchain information to be stored in a newly appended blocks.

FIG. 5I shows an example of a two-dimensional matrix 507 which may correspond to the dictionary generated based on the "saved" clusters indicated in the decision tree of FIG. 5H. The matrix includes a vertical column of properties (e.g., outlook, temperature, humidity wind) and a horizontal column of letters. Each letter may correspond to the first letter of a value corresponding to one of the properties listed in the vertical column. For example, the letter "c" corresponds to the value "cool" for the temperature property. The letter "O" corresponds to the value "overcast" for the property outlook. The letter "R" corresponds to the value "rainy" for the property outlook. The letter "N" corresponds to the value of "normal" for the property humidity. And, the value "T" corresponds to the value "true" for the property wind.

The references or identifiers (e.g., second information) are included in the dictionary matrix in the form of transaction IDs. For example, each node in a linked list may be designated with a TransactionId that serves as a reference for the first occurrence of a value for the property corresponding to the node on the ledger. These references, or transaction-IDs, are shown in the dictionary of FIG. 5I. For example, references for the <property, value> pairs that satisfy the conditions of temperature=cool and Windy=true (e.g., enclosed by the curve in FIG. 5I1) are saved in the dictionary. These reference for the entries in the dictionary that correspond to these conditions is Transaction #7, which indicates the first transaction recorded in the blockchain that satisfies the conditions where temperature=cool and Windy=true.

After the machine-learning algorithm has created the dictionary based on the training set of data, the algorithm may continue to update the decision tree with more levels and/or nodes as new <property, value> pairs are received in information to be stored in the blockchain. The dictionary may then be modified to reflect the updates to the decision tree. Additionally, or alternatively, the decision tree and dictionary may be modified based on newly received information to be stored in the blockchain and/or based on edits or revisions indicated, for example, by a consensus of the peer nodes and/or a related policy change.

Figure 5J:
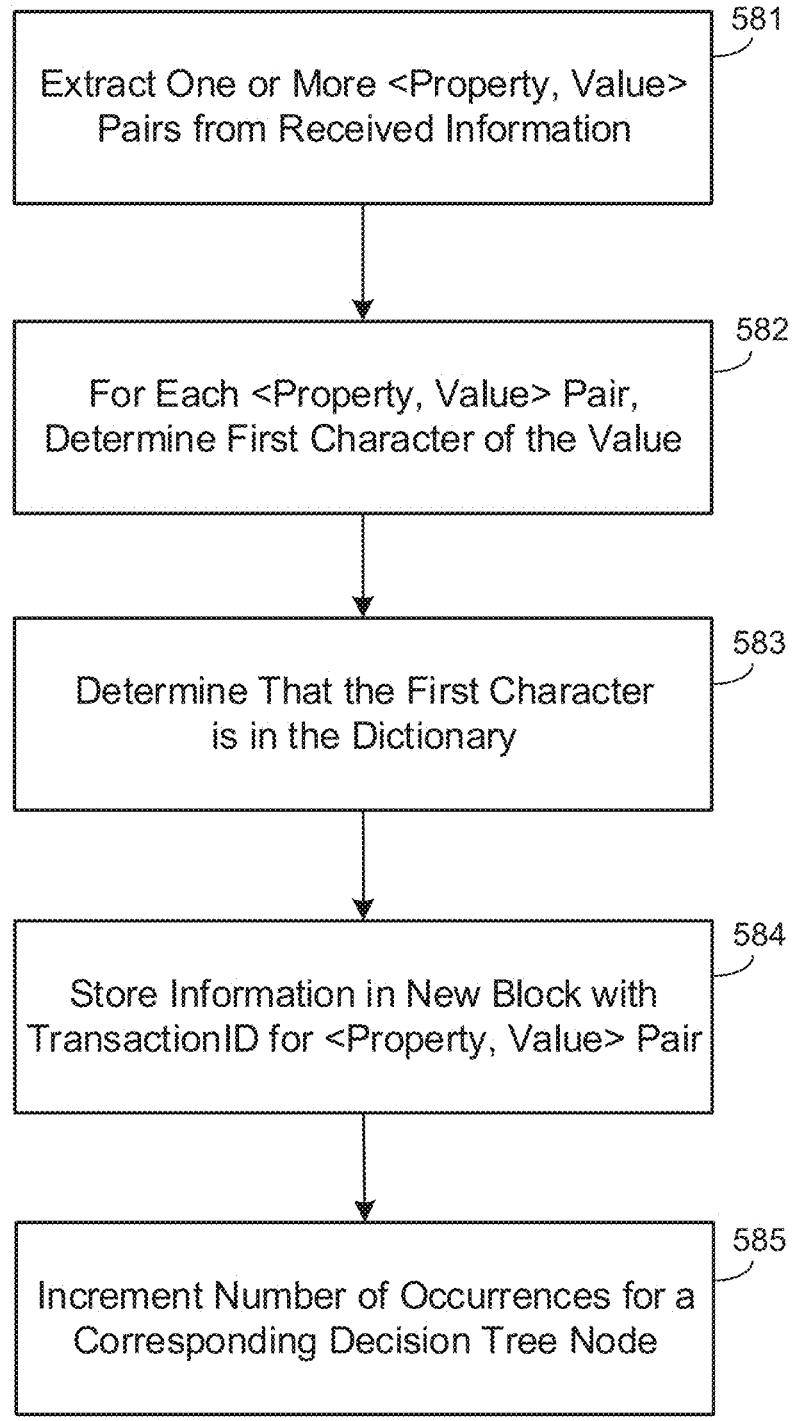
FIG. 5J illustrates a further flow diagram, according to example embodiments.

FIG. 5J shows an embodiment of a method 508 for writing a transaction in a new block of a blockchain using the dictionary as previously described. At 581, when information is received for storage in a new block of a blockchain, logic driving the machine-language algorithm (e.g., as illustrated in FIG. 1A) extracts one or more <property, value> pairs from the received information. The <property, value> pair(s) may correspond to the first information previously described. At 582, for each property, the first character (e.g., letter or number) of the value is identified. At 583, a search is then performed to determine whether the first character of the value is in the dictionary. If no, then the received information is stored in a new block with the first information. If yes, at 584, the received information is stored in the new block in a format where the first information (e.g., recurring information as previously described) is replaced with the reference (e.g., transactionID), previously described as the second information, indicated in the corresponding entry (linked list) in the dictionary. At 585, the number of occurrences for a corresponding one of the nodes in the decision tree may then be (appended 1 to act as the leftmost bit to the reference value to indicate that first information is replaced with second information) by 1 using the machine-learning algorithm. In one embodiment, if a similar value is found in one of the referenced transactions, then (1+the found transactionId) may be written as the value of the property. Otherwise, the value of the property may be written as is in the ledger.

Figure 5K:
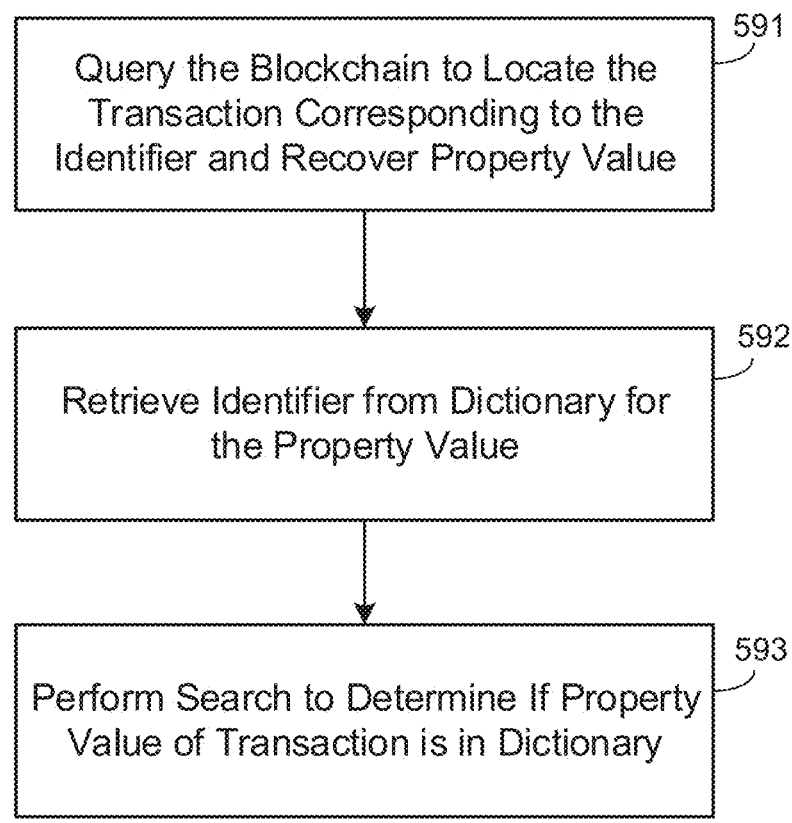
FIG. 5K illustrates a further flow diagram, according to example embodiments.

FIG. 5K shows an embodiment of a method 509 for reading a transaction previously stored in the blockchain in order to retrieve a property value that has been replaced. The method includes, at 591, querying the blockchain to locate a transaction (in an associated block) corresponding to a transactionID corresponding to the property value. Because the transaction includes the property value (e.g., the first information), the property value may be recovered. As previously indicated, the transaction ID may therefore serve to link to allow the first information (property value) to be retrieved based on the second information (transactionID).

At 592, if the flag for the property value is in (blockchain) the (e.g., flag=1), the identifier (e.g., transactionID) saved in the dictionary for that property value (e.g., after the flag value is set) is retrieved from the dictionary.

At 593, a search is performed to determine whether a property value included in the transaction is in the dictionary. In one embodiment, each of the property values in the dictionary may be associated with a flag (leftmost bit in blockchain's referenced value) or in a register or other storage area external to the dictionary. The search may therefore involve locating the checking the flag bit corresponding to the property value while reading from block to see whether it is set to a logical 1 (saved in the dictionary) or logical 0 (not saved in the dictionary). In one embodiment, the aforementioned operations may be summarized as follows: perform a read against the ledger, and if any information (property value) contains flag 1 then this information will correspond to the second information and may be used as a basis for accessing the first information using dictionary.

In accordance with one or more embodiments, replacing the first information with the second information for transaction or other information to be stored in the blockchain allows for a significant amount of storage savings. For example, for the dataset of FIG. 5C or FIG. 5D, if there are four matching properties and each property has a size of 85 KB, storage requirements may be reduced by 99.85%. Equation (3) provides one way of measuring the storage reduction achieved by the replacement operation performed in accordance with one or more the embodiments described herein.

$$\text{Total Storage Size} = (PR)\left(\sum_{i=1}^{n}(M)(R) + \left((P-M)\left(\sum_{j=1}^{k}(S)\right)\right)\right)$$

Figure 6A:
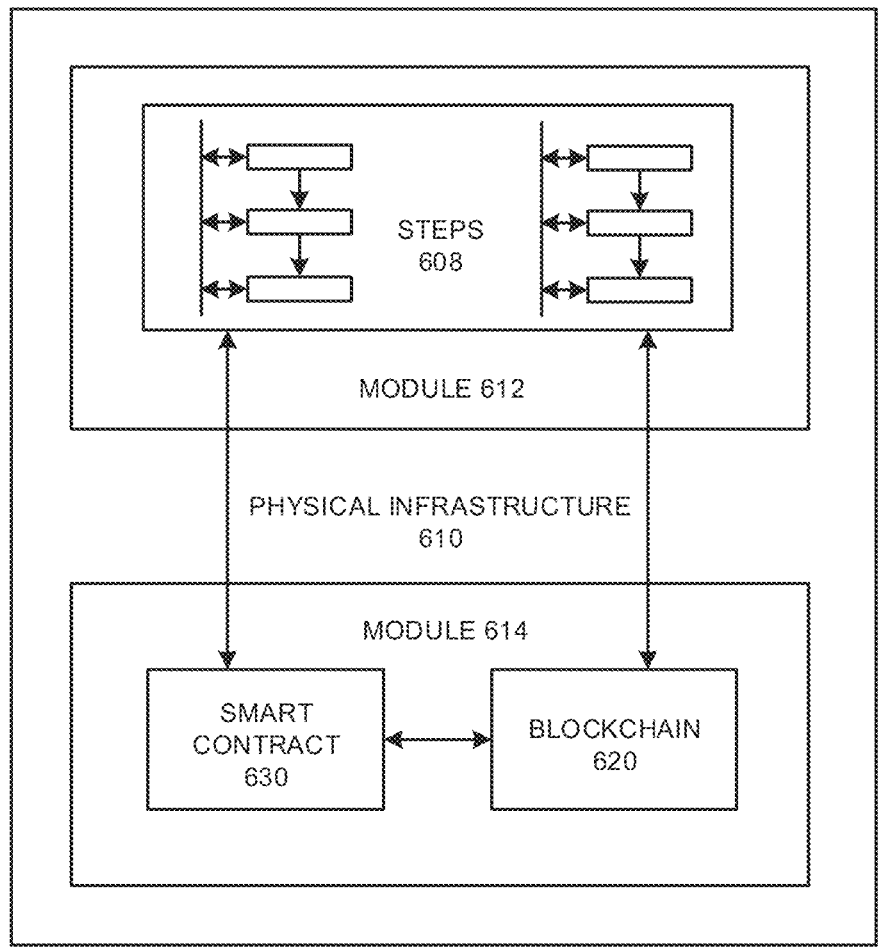
FIG. 6A illustrates an example system configured to perform one or more operations described herein, according to example embodiments.

$M$ = number of matching properties $P$ = total number of properties $R$ = size of Reference $S$ = total sizes of properties $PR$ = number of peers $k$ = number of properties $n$ = number of transactions FIG. 6A illustrates an example system 600 that includes a physical infrastructure 610 configured to perform various operations according to example embodiments. Referring to FIG. 6A, the physical infrastructure 610 includes a module 612 and a module 614. The module 614 includes a blockchain 620 and a smart contract 630 (which may reside on the blockchain 620), that may execute any of the operational steps 608 (in module 612) included in any of the example embodiments. The steps/operations 608 may include one or more of the embodiments described or depicted and may represent output or written information that is written or read from one or more smart contracts 630 and/or blockchains 620. The physical infrastructure 610, the module 612, and the module 614 may include one or more computers, servers, processors, memories, and/or wireless communication devices. Further, the module 612 and the module 614 may be a same module.

Figure 6B:
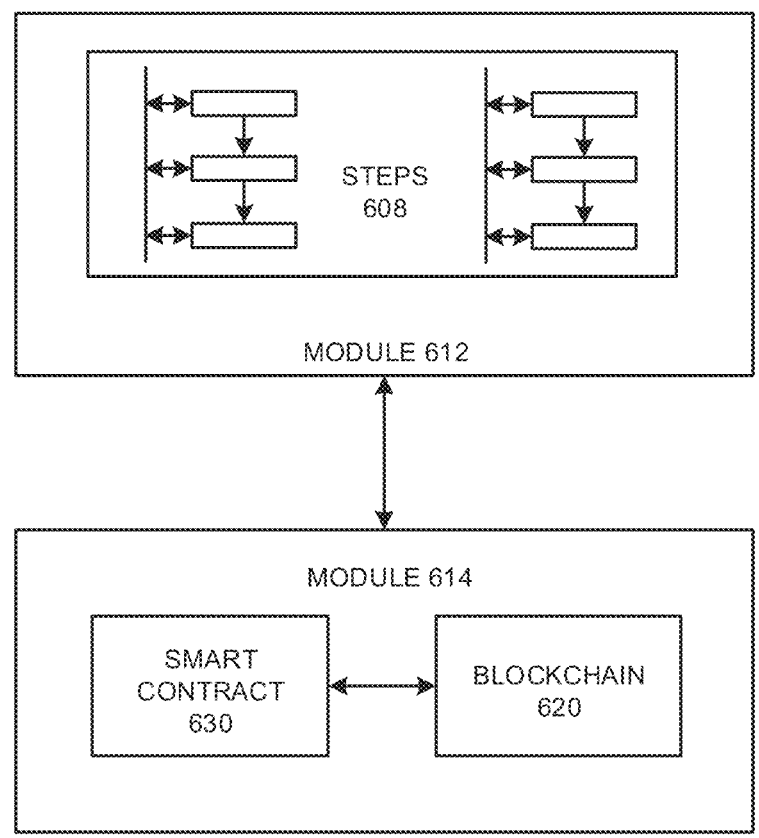
FIG. 6B illustrates another example system configured to perform one or more operations described herein, according to example embodiments.

FIG. 6B illustrates another example system 640 configured to perform various operations according to example embodiments. Referring to FIG. 6B, the system 640 includes a module 612 and a module 614. The module 614 includes a blockchain 620 and a smart contract 630 (which may reside on the blockchain 620), that may execute any of the operational steps 608 (in module 612) included in any of the example embodiments. The steps/operations 608 may include one or more of the embodiments described or depicted and may represent output or written information that is written or read from one or more smart contracts 630 and/or blockchains 620. The physical infrastructure 610, the module 612, and the module 614 may include one or more computers, servers, processors, memories, and/or wireless communication devices. Further, the module 612 and the module 614 may be a same module.

Figure 6C:
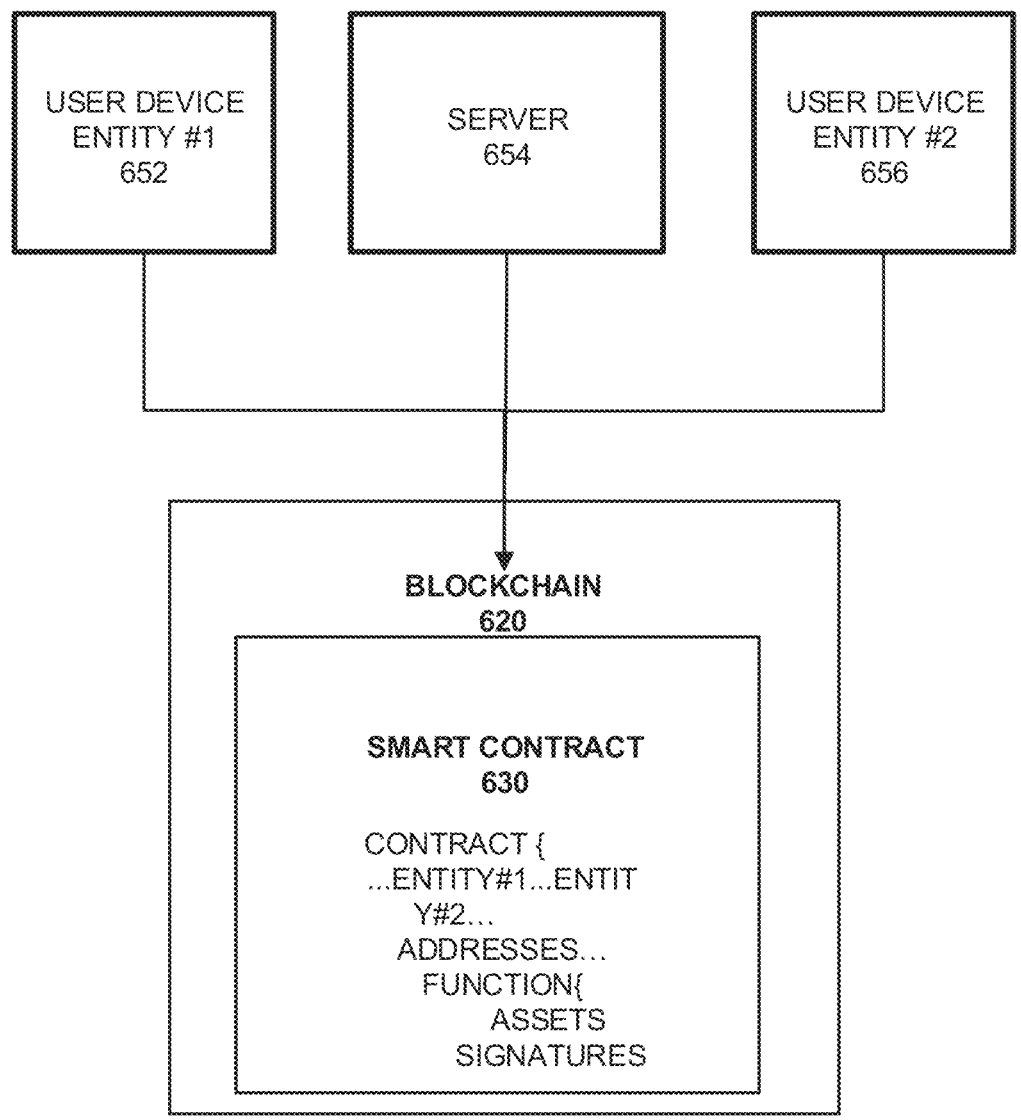
FIG. 6C illustrates a further example system configured to utilize a smart contract, according to example embodiments.

FIG. 6C illustrates an example system configured to utilize a smart contract configuration among contracting parties and a mediating server configured to enforce the smart contract terms on the blockchain according to example embodiments. Referring to FIG. 6C, the configuration 650 may represent a communication session, an asset transfer session or a process or procedure that is driven by a smart contract 630 which explicitly identifies one or more user devices 652 and/or 656. The execution, operations and results of the smart contract execution may be managed by a server 654. Content of the smart contract 630 may require digital signatures by one or more of the entities 652 and 656 which are parties to the smart contract transaction. The results of the smart contract execution may be written to a blockchain 620 as a blockchain transaction. The smart contract 630 resides on the blockchain 620 which may reside on one or more computers, servers, processors, memories, and/or wireless communication devices.

Figure 6D:
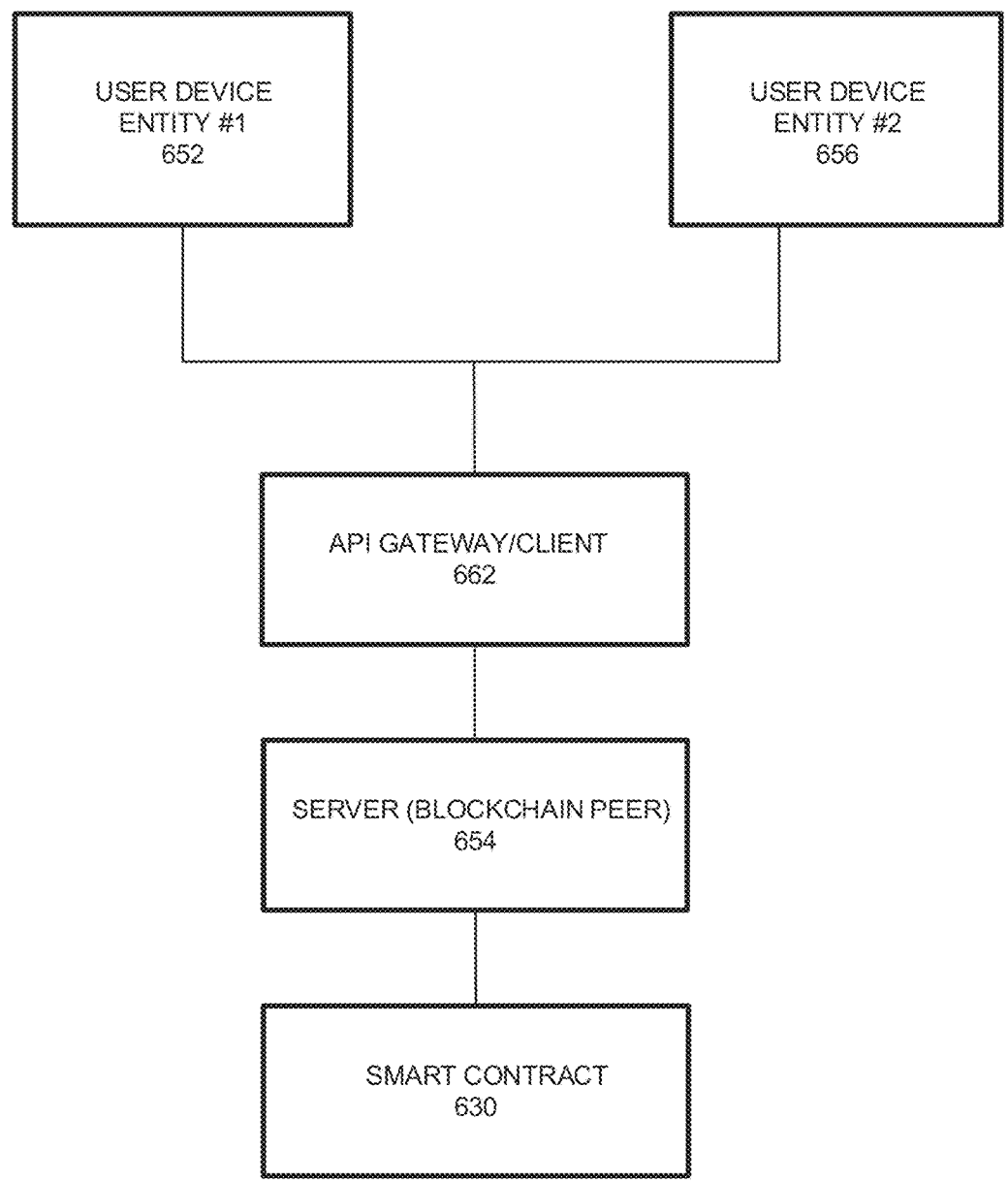
FIG. 6D illustrates yet another example system configured to utilize a blockchain, according to example embodiments.

FIG. 6D illustrates a system 660 including a blockchain, according to example embodiments. Referring to the example of FIG. 6D, an application programming interface (API) gateway 662 provides a common interface for accessing blockchain logic (e.g., smart contract 630 or other chaincode) and data (e.g., distributed ledger, etc.). In this example, the API gateway 662 is a common interface for performing transactions (invoke, queries, etc.) on the blockchain by connecting one or more entities 652 and 656 to a blockchain peer (i.e., server 654). Here, the server 654 is a blockchain network peer component that holds a copy of the world state and a distributed ledger allowing clients 652 and 656 to query data on the world state as well as submit transactions into the blockchain network where, depending on the smart contract 630 and endorsement policy, endorsing peers will run the smart contracts 630.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components.

Figure 7A:
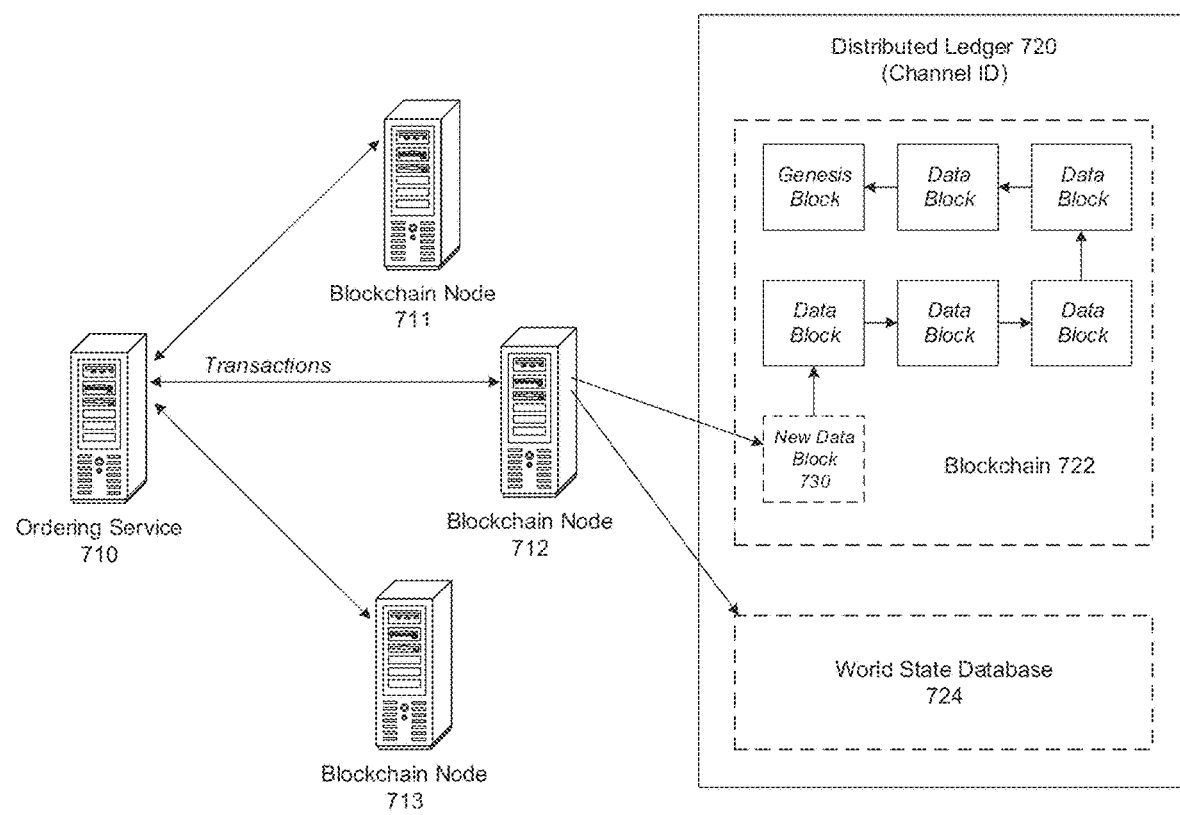
FIG. 7A illustrates a process for a new block being added to a distributed ledger, according to example embodiments.
Figure 7B:
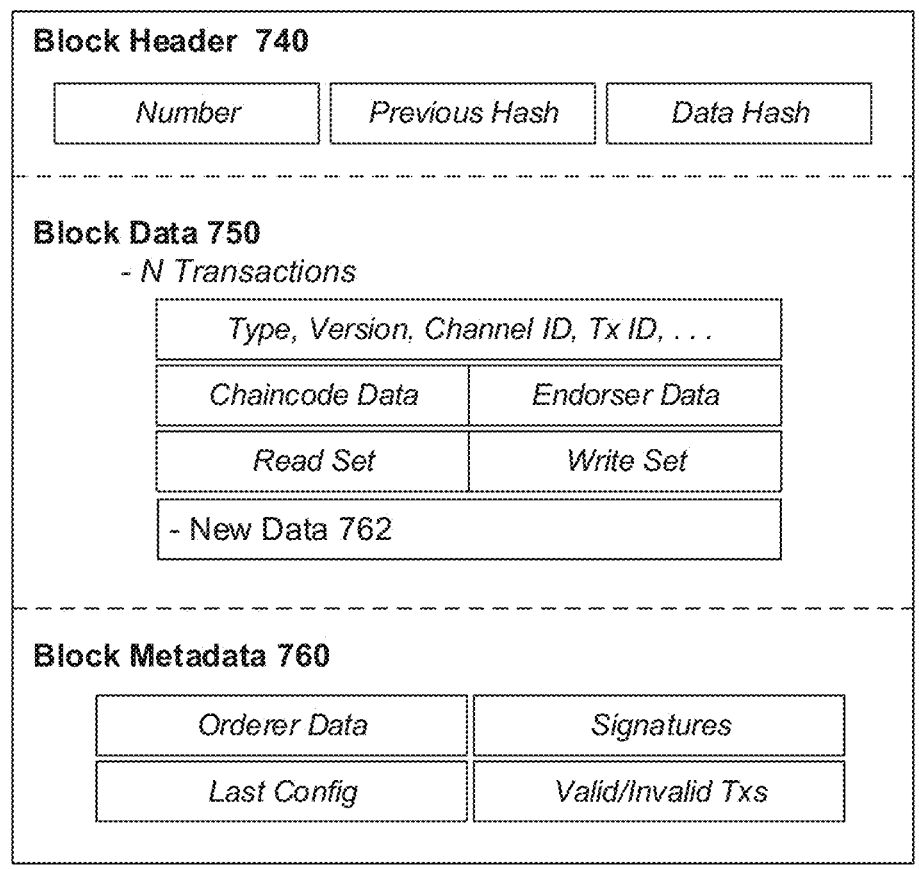
FIG. 7B illustrates contents of a new data block, according to example embodiments.

FIG. 7A illustrates a process 700 of a new block being added to a distributed ledger 720, according to example embodiments, and FIG. 7B illustrates contents of a new data block structure 730 for blockchain, according to example embodiments. Referring to FIG. 7A, clients (not shown) may submit transactions to blockchain nodes 711, 712, and/or 713. Clients may be instructions received from any source to enact activity on the blockchain 720. As an example, clients may be applications that act on behalf of a requester, such as a device, person or entity to propose transactions for the blockchain. The plurality of blockchain peers (e.g., blockchain nodes 711, 712, and 713) may maintain a state of the blockchain network and a copy of the distributed ledger 720. Different types of blockchain nodes/peers may be present in the blockchain network including endorsing peers which simulate and endorse transactions proposed by clients and committing peers which verify endorsements, validate transactions, and commit transactions to the distributed ledger 720. In this example, the blockchain nodes 711, 712, and 713 may perform the role of endorser node, committer node, or both.

The distributed ledger 720 includes a blockchain which stores immutable, sequenced records in blocks, and a state database 724 (current world state) maintaining a current state of the blockchain 722. One distributed ledger 720 may exist per channel and each peer maintains its own copy of the distributed ledger 720 for each channel of which they are a member. The blockchain 722 is a transaction log, structured as hash-linked blocks where each block contains a sequence of N transactions. Blocks may include various components such as shown in FIG. 7B. The linking of the blocks (shown by arrows in FIG. 7A) may be generated by adding a hash of a prior block's header within a block header of a current block. In this way, all transactions on the blockchain 722 are sequenced and cryptographically linked together preventing tampering with blockchain data without breaking the hash links. Furthermore, because of the links, the latest block in the blockchain 722 represents every transaction that has come before it. The blockchain 722 may be stored on a peer file system (local or attached storage), which supports an append-only blockchain workload.

The current state of the blockchain 722 and the distributed ledger 722 may be stored in the state database 724. Here, the current state data represents the latest values for all keys ever included in the chain transaction log of the blockchain 722. Chaincode invocations execute transactions against the current state in the state database 724. To make these chaincode interactions extremely efficient, the latest values of all keys are stored in the state database 724. The state database 724 may include an indexed view into the transaction log of the blockchain 722, it can therefore be regenerated from the chain at any time. The state database 724 may automatically get recovered (or generated if needed) upon peer startup, before transactions are accepted.

Endorsing nodes receive transactions from clients and endorse the transaction based on simulated results. Endorsing nodes hold smart contracts which simulate the transaction proposals. When an endorsing node endorses a transaction, the endorsing nodes creates a transaction endorsement which is a signed response from the endorsing node to the client application indicating the endorsement of the simulated transaction. The method of endorsing a transaction depends on an endorsement policy which may be specified within chaincode. An example of an endorsement policy is "the majority of endorsing peers must endorse the transaction". Different channels may have different endorsement policies. Endorsed transactions are forward by the client application to ordering service 710.

The ordering service 710 accepts endorsed transactions, orders them into a block, and delivers the blocks to the committing peers. For example, the ordering service 710 may initiate a new block when a threshold of transactions has been reached, a timer times out, or another condition. In the example of FIG. 7A, blockchain node 712 is a committing peer that has received a new data new data block 730 for storage on blockchain 720. The first block in the blockchain may be referred to as a genesis block which includes information about the blockchain, its members, the data stored therein, etc.

The ordering service 710 may be made up of a cluster of orderers. The ordering service 710 does not process transactions, smart contracts, or maintain the shared ledger. Rather, the ordering service 710 may accept the endorsed transactions and specifies the order in which those transactions are committed to the distributed ledger 720. The architecture of the blockchain network may be designed such that the specific implementation of 'ordering' (e.g., Solo, Kafka, BFT, etc.) becomes a pluggable component.

Transactions are written to the distributed ledger 720 in a consistent order. The order of transactions is established to ensure that the updates to the state database 724 are valid when they are committed to the network. Unlike a cryptocurrency blockchain system (e.g., Bitcoin, etc.) where ordering occurs through the solving of a cryptographic puzzle, or mining, in this example the parties of the distributed ledger 720 may choose the ordering mechanism that best suits that network.

When the ordering service 710 initializes a new data block 730, the new data block 730 may be broadcast to committing peers (e.g., blockchain nodes 711, 712, and 713). In response, each committing peer validates the transaction within the new data block 730 by checking to make sure that the read set and the write set still match the current world state in the state database 724. Specifically, the committing peer can determine whether the read data that existed when the endorsers simulated the transaction is identical to the current world state in the state database 724. When the committing peer validates the transaction, the transaction is written to the blockchain 722 on the distributed ledger 720, and the state database 724 is updated with the write data from the read-write set. If a transaction fails, that is, if the committing peer finds that the read-write set does not match the current world state in the state database 724, the transaction ordered into a block will still be included in that block, but it will be marked as invalid, and the state database 724 will not be updated.

Referring to FIG. 7B, a new data block 730 (also referred to as a data block) that is stored on the blockchain 722 of the distributed ledger 720 may include multiple data segments such as a block header 740, block data 750, and block metadata 760. It should be appreciated that the various depicted blocks and their contents, such as new data block 730 and its contents. shown in FIG. 7B are merely examples and are not meant to limit the scope of the example embodiments. The new data block 730 may store transactional information of N transaction(s) (e.g., 1, 10, 100, 500, 1000, 2000, 3000, etc.) within the block data 750. The new data block 730 may also include a link to a previous block (e.g., on the blockchain 722 in FIG. 7A) within the block header 740. In particular, the block header 740 may include a hash of a previous block's header. The block header 740 may also include a unique block number, a hash of the block data 750 of the new data block 730, and the like. The block number of the new data block 730 may be unique and assigned in various orders, such as an incremental/sequential order starting from zero.

The block data 750 may store transactional information of each transaction that is recorded within the new data block 730. For example, the transaction data may include one or more of a type of the transaction, a version, a timestamp, a channel ID of the distributed ledger 720, a transaction ID, an epoch, a payload visibility, a chaincode path (deploy tx), a chaincode name, a chaincode version, input (chaincode and functions), a client (creator) identify such as a public key and certificate, a signature of the client, identities of endorsers, endorser signatures, a proposal hash, chaincode events, response status, namespace, a read set (list of key and version read by the transaction, etc.), a write set (list of key and value, etc.), a start key, an end key, a list of keys, a Merkel tree query summary, and the like. The transaction data may be stored for each of the N transactions.

In some embodiments, the block data 750 may also store new data 762 which adds additional information to the hash-linked chain of blocks in the blockchain 722. The additional information includes one or more of the steps, features, processes and/or actions described or depicted herein. Accordingly, the new data 762 can be stored in an immutable log of blocks on the distributed ledger 720. Some of the benefits of storing such new data 762 are reflected in the various embodiments disclosed and depicted herein. Although in FIG. 7B the new data 762 is depicted in the block data 750 but could also be located in the block header 740 or the block metadata 760.

The block metadata 760 may store multiple fields of metadata (e.g., as a byte array, etc.). Metadata fields may include signature on block creation, a reference to a last configuration block, a transaction filter identifying valid and invalid transactions within the block, last offset persisted of an ordering service that ordered the block, and the like. The signature, the last configuration block, and the orderer metadata may be added by the ordering service 710. Meanwhile, a committer of the block (such as blockchain node 712) may add validity/invalidity information based on an endorsement policy, verification of read/write sets, and the like. The transaction filter may include a byte array of a size equal to the number of transactions in the block data 750 and a validation code identifying whether a transaction was valid/invalid.

Figure 7C:
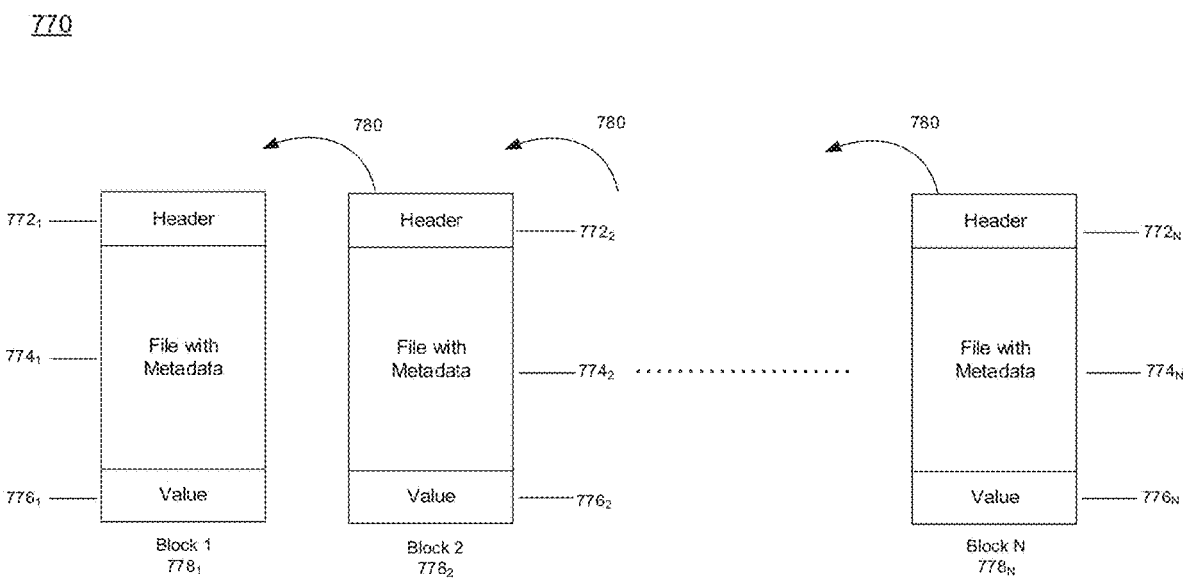
FIG. 7C illustrates a blockchain for digital content, according to example embodiments.

FIG. 7C illustrates an embodiment of a blockchain 770 for digital content in accordance with the embodiments described herein. The digital content may include one or more files and associated information. The files may include media, images, video, audio, text, links, graphics, animations, web pages, documents, or other forms of digital content. The immutable, append-only aspects of the blockchain serve as a safeguard to protect the integrity, validity, and authenticity of the digital content, making it suitable use in legal proceedings where admissibility rules apply or other settings where evidence is taken into consideration or where the presentation and use of digital information is otherwise of interest. In this case, the digital content may be referred to as digital evidence.

The blockchain may be formed in various ways. In one embodiment, the digital content may be included in and accessed from the blockchain itself. For example, each block of the blockchain may store a hash value of reference information (e.g., header, value, etc.) along the associated digital content. The hash value and associated digital content may then be encrypted together. Thus, the digital content of each block may be accessed by decrypting each block in the blockchain, and the hash value of each block may be used as a basis to reference a previous block. This may be illustrated as follows:

| Block 1 | Block 2 | ... | Block N |
|---|---|---|---|
| Hash Value 1 | Hash Value 2 | | Hash Value N |
| Digital Content 1 | Digital Content 2 | | Digital Content N |

In one embodiment, the digital content may be not included in the blockchain. For example, the blockchain may store the encrypted hashes of the content of each block without any of the digital content. The digital content may be stored in another storage area or memory address in association with the hash value of the original file. The other storage area may be the same storage device used to store the blockchain or may be a different storage area or even a separate relational database. The digital content of each block may be referenced or accessed by obtaining or querying the hash value of a block of interest and then looking up that has value in the storage area, which is stored in correspondence with the actual digital content. This operation may be performed, for example, a database gatekeeper. This may be illustrated as follows:

| Blockchain | Storage Area |
|---|---|
| Block 1 Hash Value | Block 1 Hash Value ... Content |
| . | . |
| . | . |
| Block N Hash Value | Block N Hash Value ... Content |

In the example embodiment of FIG. 7C, the blockchain 770 includes a number of blocks 7781, 7782, ... 778N cryptographically linked in an ordered sequence, where $N \geq 1$. The encryption used to link the blocks 7781, 7782, ... 778N may be any of a number of keyed or un-keyed Hash functions. In one embodiment, the blocks 7781, 7782, ... 778N are subject to a hash function which produces n-bit alphanumeric outputs (where n is 256 or another number) from inputs that are based on information in the blocks. Examples of such a hash function include, but are not limited to, a SHA-type (SHA stands for Secured Hash Algorithm) algorithm, Merkle-Damgard algorithm, HAIFA algorithm, Merkle-tree algorithm, nonce-based algorithm, and a non-collision-resistant PRF algorithm. In another embodiment, the blocks 7781, 7782, ..., 778N may be cryptographically linked by a function that is different from a hash function. For purposes of illustration, the following description is made with reference to a hash function, e.g., SHA-2.

Each of the blocks 7781, 7782, . . . , 778N in the blockchain includes a header, a version of the file, and a value. The header and the value are different for each block as a result of hashing in the blockchain. In one embodiment, the value may be included in the header. As described in greater detail below, the version of the file may be the original file or a different version of the original file.

The first block 7781 in the blockchain is referred to as the genesis block and includes the header 7721, original file 7741, and an initial value 7761. The hashing scheme used for the genesis block, and indeed in all subsequent blocks, may vary. For example, all the information in the first block 7781 may be hashed together and at one time, or each or a portion of the information in the first block 7781 may be separately hashed and then a hash of the separately hashed portions may be performed.

The header 7721 may include one or more initial parameters, which, for example, may include a version number, timestamp, nonce, root information, difficulty level, consensus protocol, duration, media format, source, descriptive keywords, and/or other information associated with original file 7741 and/or the blockchain. The header 7721 may be generated automatically (e.g., by blockchain network managing software) or manually by a blockchain participant. Unlike the header in other blocks 7782 to 778N in the blockchain, the header 7721 in the genesis block does not reference a previous block, simply because there is no previous block.

The original file 7741 in the genesis block may be, for example, data as captured by a device with or without processing prior to its inclusion in the blockchain. The original file 7741 is received through the interface of the system from the device, media source, or node. The original file 7741 is associated with metadata, which, for example, may be generated by a user, the device, and/or the system processor, either manually or automatically. The metadata may be included in the first block 7781 in association with the original file 7741.

The value 7761 in the genesis block is an initial value generated based on one or more unique attributes of the original file 7741. In one embodiment, the one or more unique attributes may include the hash value for the original file 7741, metadata for the original file 7741, and other information associated with the file. In one implementation, the initial value 7761 may be based on the following unique attributes:

1) SHA-2 computed hash value for the original file
2) originating device ID
3) starting timestamp for the original file
4) initial storage location of the original file
5) blockchain network member ID for software to currently control the original file and associated metadata The other blocks 7782 to 778N in the blockchain also have headers, files, and values. However, unlike the first block 7721, each of the headers 7722 to 772N in the other blocks includes the hash value of an immediately preceding block. The hash value of the immediately preceding block may be just the hash of the header of the previous block or may be the hash value of the entire previous block. By including the hash value of a preceding block in each of the remaining blocks, a trace can be performed from the Nth block back to the genesis block (and the associated original file) on a block-by-block basis, as indicated by arrows 780, to establish an auditable and immutable chain-of-custody.

Each of the header 7722 to 772N in the other blocks may also include other information, e.g., version number, timestamp, nonce, root information, difficulty level, consensus protocol, and/or other parameters or information associated with the corresponding files and/or the blockchain in general.

The files 7742 to 774N in the other blocks may be equal to the original file or may be a modified version of the original file in the genesis block depending, for example, on the type of processing performed. The type of processing performed may vary from block to block. The processing may involve, for example, any modification of a file in a preceding block, such as redacting information or otherwise changing the content of, taking information away from, or adding or appending information to the files.

Additionally, or alternatively, the processing may involve merely copying the file from a preceding block, changing a storage location of the file, analyzing the file from one or more preceding blocks, moving the file from one storage or memory location to another, or performing action relative to the file of the blockchain and/or its associated metadata. Processing which involves analyzing a file may include, for example, appending, including, or otherwise associating various analytics, statistics, or other information associated with the file.

The values in each of the other blocks 7762 to 776N in the other blocks are unique values and are all different as a result of the processing performed. For example, the value in any one block corresponds to an updated version of the value in the previous block. The update is reflected in the hash of the block to which the value is assigned. The values of the blocks therefore provide an indication of what processing was performed in the blocks and also permit a tracing through the blockchain back to the original file. This tracking confirms the chain-of-custody of the file throughout the entire blockchain.

For example, consider the case where portions of the file in a previous block are redacted, blocked out, or pixelated in order to protect the identity of a person shown in the file. In this case, the block including the redacted file will include metadata associated with the redacted file, e.g., how the redaction was performed, who performed the redaction, timestamps where the redaction(s) occurred, etc. The metadata may be hashed to form the value. Because the metadata for the block is different from the information that was hashed to form the value in the previous block, the values are different from one another and may be recovered when decrypted.

Figure 7D:
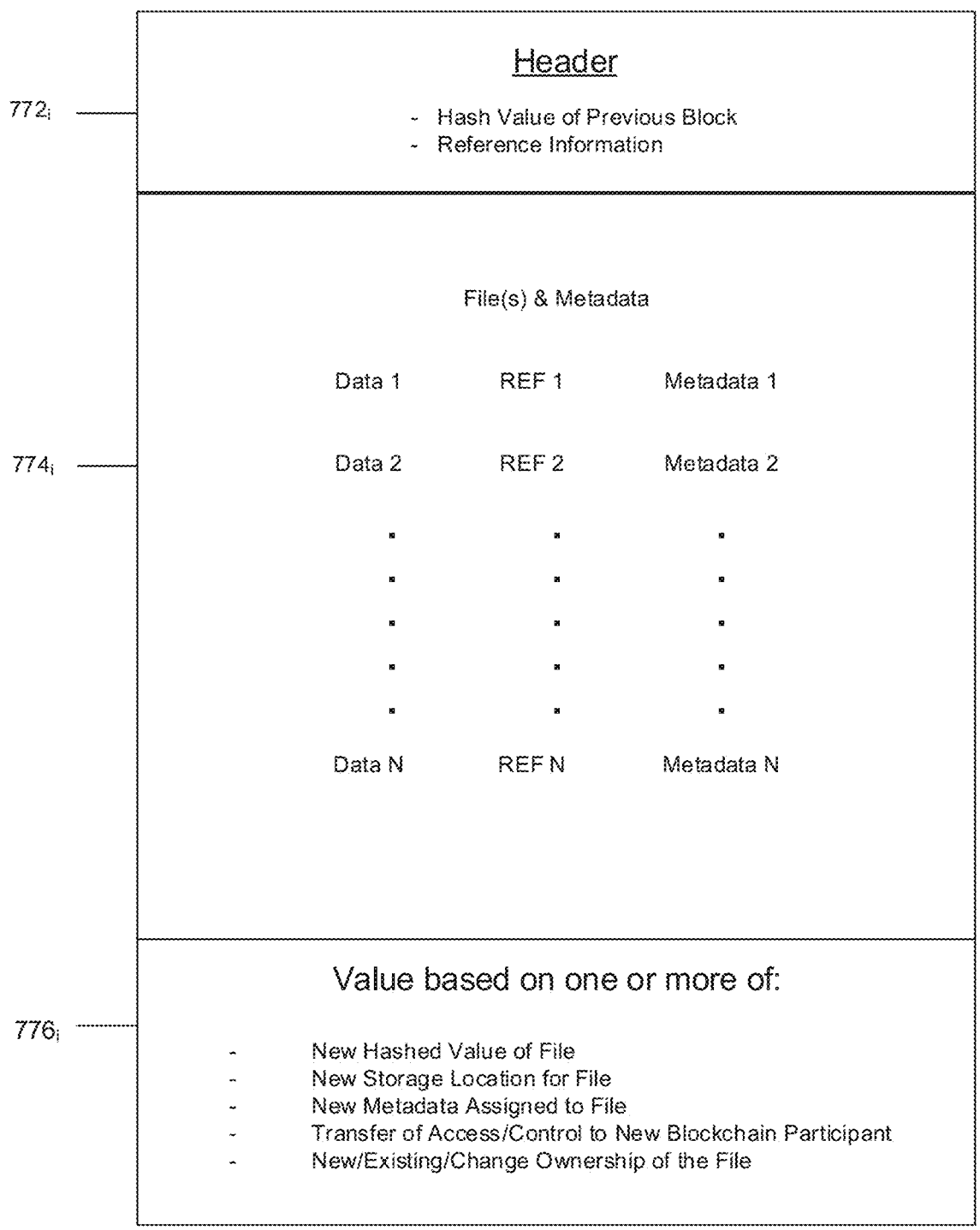
FIG. 7D illustrates a block which may represent the structure of blocks in the blockchain, according to example embodiments.

In one embodiment, the value of a previous block may be updated (e.g., a new hash value computed) to form the value of a current block when any one or more of the following occurs. The new hash value may be computed by hashing all or a portion of the information noted below, in this example embodiment.

a) new SHA-2 computed hash value if the file has been processed in any way (e.g., if the file was redacted, copied, altered, accessed, or some other action was taken)
b) new storage location for the file
c) new metadata identified associated with the file
d) transfer of access or control of the file from one blockchain participant to another blockchain participant FIG. 7D illustrates an embodiment of a block which may represent the structure of the blocks in the blockchain 790 in accordance with one embodiment. The block, Block$_i$, includes a header 772$i$, a file 774$i$, and a value 776$i$.

The header 772*i* includes a hash value of a previous block Blocki-1 and additional reference information, which, for example, may be any of the types of information (e.g., header information including references, characteristics, parameters, etc.) discussed herein. All blocks reference the hash of a previous block except, of course, the genesis block. The hash value of the previous block may be just a hash of the header in the previous block or a hash of all or a portion of the information in the previous block, including the file and metadata.

The file 774*i* includes a plurality of data, such as Data 1, Data 2, . . . , Data N in sequence. The data are tagged with metadata Metadata 1, Metadata 2, . . . , Metadata N which describe the content and/or characteristics associated with the data. For example, the metadata for each data may include information to indicate a timestamp for the data, process the data, keywords indicating the persons or other content depicted in the data, and/or other features that may be helpful to establish the validity and content of the file as a whole, and particularly its use a digital evidence, for example, as described in connection with an embodiment discussed below. In addition to the metadata, each data may be tagged with reference REF1, REF2, . . . , REFN to a previous data to prevent tampering, gaps in the file, and sequential reference through the file.

Once the metadata is assigned to the data (e.g., through a smart contract), the metadata cannot be altered without the hash changing, which can easily be identified for invalidation. The metadata, thus, creates a data log of information that may be accessed for use by participants in the blockchain.

The value 776*i* is a hash value or other value computed based on any of the types of information previously discussed. For example, for any given block Blocki, the value for that block may be updated to reflect the processing that was performed for that block, e.g., new hash value, new storage location, new metadata for the associated file, transfer of control or access, identifier, or other action or information to be added. Although the value in each block is shown to be separate from the metadata for the data of the file and header, the value may be based, in part or whole, on this metadata in another embodiment.

Once the blockchain 770 is formed, at any point in time, the immutable chain-of-custody for the file may be obtained by querying the blockchain for the transaction history of the values across the blocks. This query, or tracking procedure, may begin with decrypting the value of the block that is most currently included (e.g., the last (Nth) block), and then continuing to decrypt the value of the other blocks until the genesis block is reached and the original file is recovered. The decryption may involve decrypting the headers and files and associated metadata at each block, as well.

Decryption is performed based on the type of encryption that took place in each block. This may involve the use of private keys, public keys, or a public key-private key pair. For example, when asymmetric encryption is used, blockchain participants or a processor in the network may generate a public key and private key pair using a predetermined algorithm. The public key and private key are associated with each other through some mathematical relationship. The public key may be distributed publicly to serve as an address to receive messages from other users, e.g., an IP address or home address. The private key is kept secret and used to digitally sign messages sent to other blockchain participants. The signature is included in the message so that the recipient can verify using the public key of the sender. This way, the recipient can be sure that only the sender could have sent this message.

Generating a key pair may be analogous to creating an account on the blockchain, but without having to actually register anywhere. Also, every transaction that is executed on the blockchain is digitally signed by the sender using their private key. This signature ensures that only the owner of the account can track and process (if within the scope of permission determined by a smart contract) the file of the blockchain.

Figure 8A:
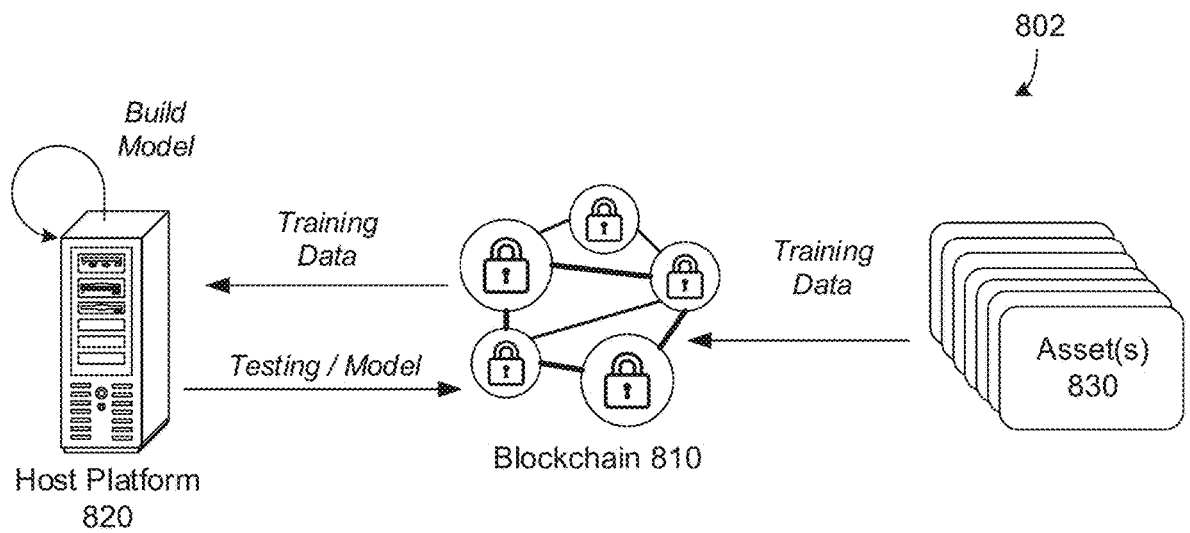
FIG. 8A illustrates an example blockchain which stores machine learning (artificial intelligence) data, according to example embodiments.
Figure 8A:
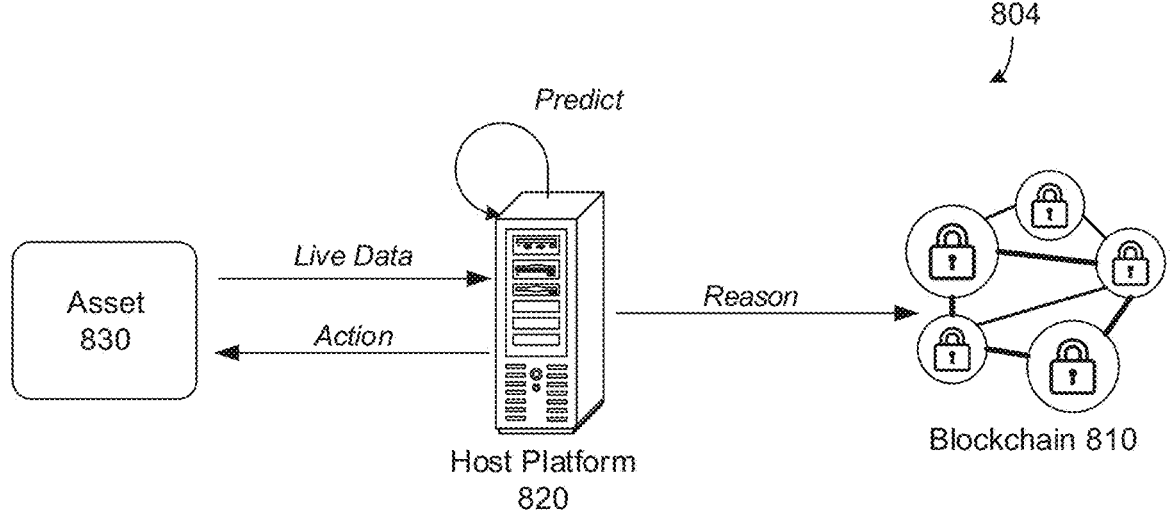
Figure 8B:
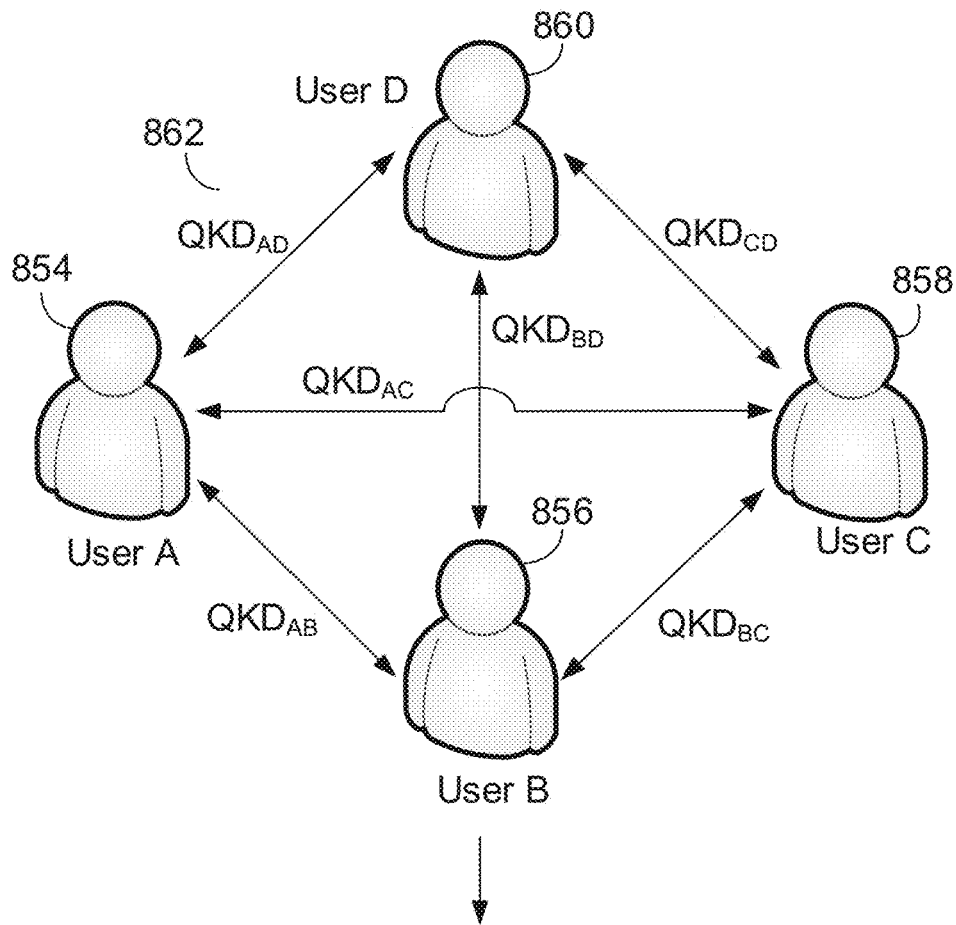
FIG. 8B illustrates an example quantum-secure blockchain, according to example embodiments.
Figure 8B:
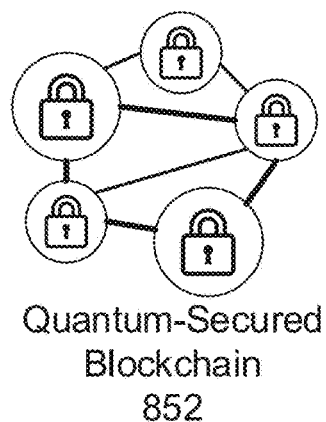

FIGS. 8A and 8B illustrate additional examples of use cases for blockchain which may be incorporated and used herein. In particular, FIG. 8A illustrates an example 800 of a blockchain 810 which stores machine learning (artificial intelligence) data. Machine learning relies on vast quantities of historical data (or training data) to build predictive models for accurate prediction on new data. Machine learning software (e.g., neural networks, etc.) can often sift through millions of records to unearth non-intuitive patterns.

In the example of FIG. 8A, a host platform 820 builds and deploys a machine learning model for predictive monitoring of assets 830. Here, the host platform 820 may be a cloud platform, an industrial server, a web server, a personal computer, a user device, and the like. Assets 830 can be any type of asset (e.g., machine or equipment, etc.) such as an aircraft, locomotive, turbine, medical machinery and equipment, oil and gas equipment, boats, ships, vehicles, and the like. As another example, assets 830 may be non-tangible assets such as stocks, currency, digital coins, insurance, or the like.

The blockchain 810 can be used to significantly improve both a training process 802 of the machine learning model and a predictive process 804 based on a trained machine learning model. For example, in 802, rather than requiring a data scientist/engineer or other user to collect the data, historical data may be stored by the assets 830 themselves (or through an intermediary, not shown) on the blockchain 810. This can significantly reduce the collection time needed by the host platform 820 when performing predictive model training. For example, using smart contracts, data can be directly and reliably transferred straight from its place of origin to the blockchain 810. By using the blockchain 810 to ensure the security and ownership of the collected data, smart contracts may directly send the data from the assets to the individuals that use the data for building a machine learning model. This allows for sharing of data among the assets 830.

The collected data may be stored in the blockchain 810 based on a consensus mechanism. The consensus mechanism pulls in (permissioned nodes) to ensure that the data being recorded is verified and accurate. The data recorded is time-stamped, cryptographically signed, and immutable. It is therefore auditable, transparent, and secure. Adding IoT devices which write directly to the blockchain can, in certain cases (i.e. supply chain, healthcare, logistics, etc.), increase both the frequency and accuracy of the data being recorded.

Furthermore, training of the machine learning model on the collected data may take rounds of refinement and testing by the host platform 820. Each round may be based on additional data or data that was not previously considered to help expand the knowledge of the machine learning model. In 802, the different training and testing steps (and the data associated therewith) may be stored on the blockchain 810 by the host platform 820. Each refinement of the machine learning model (e.g., changes in variables, weights, etc.) may be stored on the blockchain 810. This provides verifiable proof of how the model was trained and what data was used to train the model. Furthermore, when the host platform 820 has achieved a finally trained model, the resulting model may be stored on the blockchain 810.

After the model has been trained, it may be deployed to a live environment where it can make predictions/decisions based on the execution of the final trained machine learning model. For example, in 804, the machine learning model may be used for condition-based maintenance (CBM) for an asset such as an aircraft, a wind turbine, a healthcare machine, and the like. In this example, data fed back from the asset 830 may be input the machine learning model and used to make event predictions such as failure events, error codes, and the like. Determinations made by the execution of the machine learning model at the host platform 820 may be stored on the blockchain 810 to provide auditable/verifiable proof. As one non-limiting example, the machine learning model may predict a future breakdown/failure to a part of the asset 830 and create alert or a notification to replace the part. The data behind this decision may be stored by the host platform 820 on the blockchain 810. In one embodiment the features and/or the actions described and/or depicted herein can occur on or with respect to the blockchain 810.

New transactions for a blockchain can be gathered together into a new block and added to an existing hash value. This is then encrypted to create a new hash for the new block. This is added to the next list of transactions when they are encrypted, and so on. The result is a chain of blocks that each contain the hash values of all preceding blocks. Computers that store these blocks regularly compare their hash values to ensure that they are all in agreement. Any computer that does not agree, discards the records that are causing the problem. This approach is good for ensuring tamper-resistance of the blockchain, but it is not perfect.

One way to game this system is for a dishonest user to change the list of transactions in their favor, but in a way that leaves the hash unchanged. This can be done by brute force, in other words by changing a record, encrypting the result, and seeing whether the hash value is the same. And if not, trying again and again and again until it finds a hash that matches. The security of blockchains is based on the belief that ordinary computers can only perform this kind of brute force attack over time scales that are entirely impractical, such as the age of the universe. By contrast, quantum computers are much faster (1000s of times faster) and consequently pose a much greater threat.

FIG. 8B illustrates an example 850 of a quantum-secure blockchain 852 which implements quantum key distribution (QKD) to protect against a quantum computing attack. In this example, blockchain users can verify each other's identities using QKD. This sends information using quantum particles such as photons, which cannot be copied by an eavesdropper without destroying them. In this way, a sender and a receiver through the blockchain can be sure of each other's identity.

In the example of FIG. 8B, four users are present 854, 856, 858, and 860. Each of pair of users may share a secret key 862 (i.e., a QKD) between themselves. Since there are four nodes in this example, six pairs of nodes exists, and therefore six different secret keys 862 are used including QKDAB, QKDAC, QKDAD, QKDBC, QKDBD, and QKDCD. Each pair can create a QKD by sending information using quantum particles such as photons, which cannot be copied by an eavesdropper without destroying them. In this way, a pair of users can be sure of each other's identity.

The operation of the blockchain 852 is based on two procedures (i) creation of transactions, and (ii) construction of blocks that aggregate the new transactions. New transactions may be created similar to a traditional blockchain network. Each transaction may contain information about a sender, a receiver, a time of creation, an amount (or value) to be transferred, a list of reference transactions that justifies the sender has funds for the operation, and the like. This transaction record is then sent to all other nodes where it is entered into a pool of unconfirmed transactions. Here, two parties (i.e., a pair of users from among 854-860) authenticate the transaction by providing their shared secret key 862 (QKD). This quantum signature can be attached to every transaction making it exceedingly difficult to tamper with. Each node checks their entries with respect to a local copy of the blockchain 852 to verify that each transaction has sufficient funds. However, the transactions are not yet confirmed.

Rather than perform a traditional mining process on the blocks, the blocks may be created in a decentralized manner using a broadcast protocol. At a predetermined period of time (e.g., seconds, minutes, hours, etc.) the network may apply the broadcast protocol to any unconfirmed transaction thereby to achieve a Byzantine agreement (consensus) regarding a correct version of the transaction. For example, each node may possess a private value (transaction data of that particular node). In a first round, nodes transmit their private values to each other. In subsequent rounds, nodes communicate the information they received in the previous round from other nodes. Here, honest nodes are able to create a complete set of transactions within a new block. This new block can be added to the blockchain 852. In one embodiment the features and/or the actions described and/or depicted herein can occur on or with respect to the blockchain 852.

Figure 9:
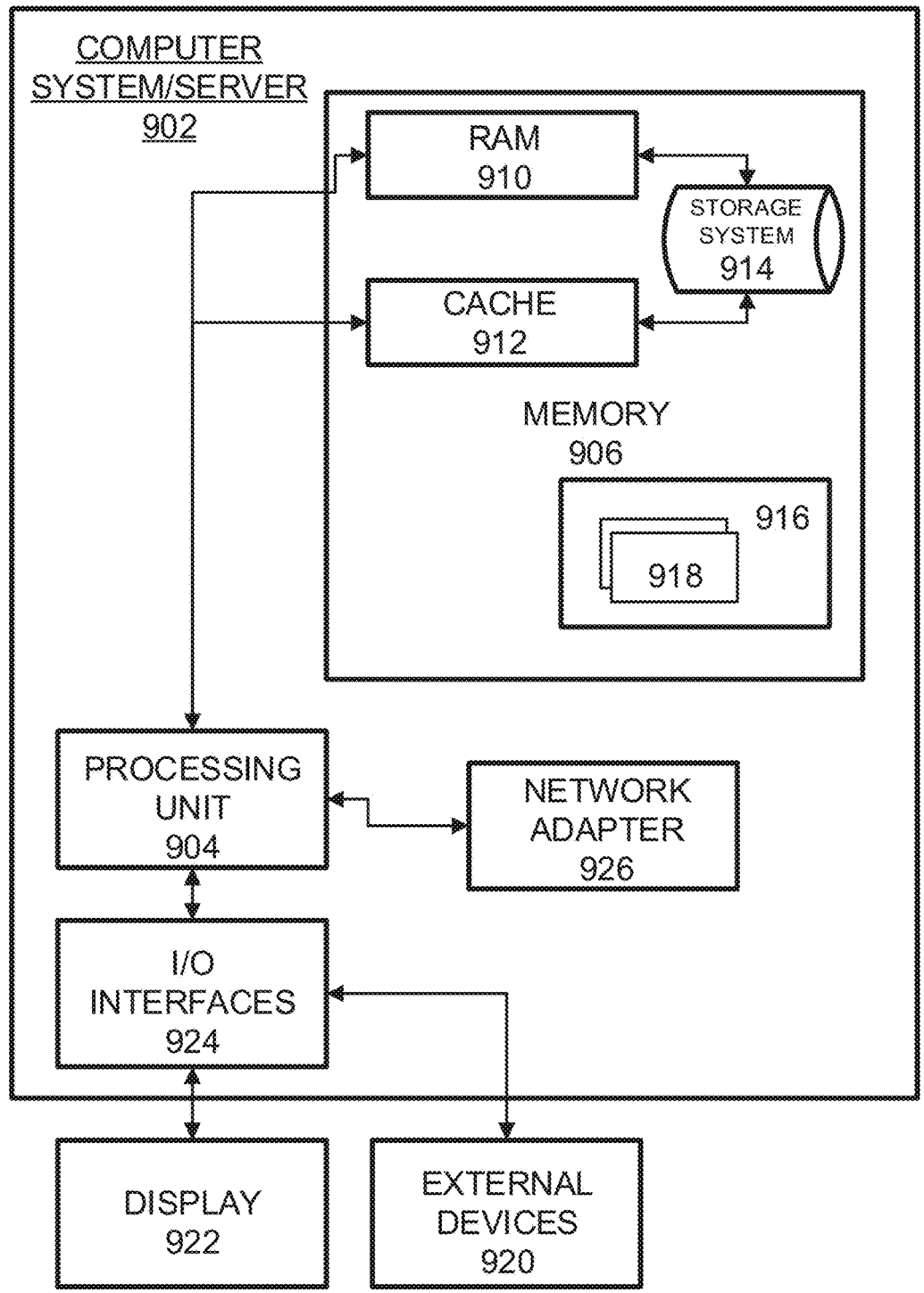
FIG. 9 illustrates an example system that supports one or more of the example embodiments.

FIG. 9 illustrates an example system 900 that supports one or more of the example embodiments described and/or depicted herein. The system 900 comprises a computer system/server 902, which is operational with numerous other general purpose or special purpose computing system environments or configurations. Examples of well-known computing systems, environments, and/or configurations that may be suitable for use with computer system/server 902 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 902 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 902 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, computer system/server 902 in cloud computing node 900 is shown in the form of a general-purpose computing device. The components of computer system/server 902 may include, but are not limited to, one or more processors or processing units 904, a system memory 906, and a bus that couples various system components including system memory 906 to processor 904.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 902 typically includes a variety of computer system readable media. Such media may be any available media that is accessible by computer system/server 902, and it includes both volatile and non-volatile media, removable and non-removable media. System memory 906, in one embodiment, implements the flow diagrams of the other figures. The system memory 906 can include computer system readable media in the form of volatile memory, such as random-access memory (RAM) 910 and/or cache memory 912. Computer system/server 902 may further include other removable/non-removable, volatile/non-volatile computer system storage media. By way of example only, storage system 914 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 906 may include one or more program products having a set (e.g., one or more) of program modules that are configured to carry out the functions of various embodiments of the application.

Program/utility 916, having a set (one or more) of program modules 918, may be stored in memory 906 by way of example, and not limitation, as well as an operating system, one or more application programs, other program modules, and program data. Each of the operating system, one or more application programs, other program modules, and program data or some combination thereof, may include an implementation of a networking environment. Program modules 918 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 902 may also communicate with one or more external devices 920 such as a keyboard, a pointing device, a display 922, etc.; one or more devices that enable a user to interact with computer system/server 902; and/or any devices (e.g., network card, modem, etc.) that enable computer system/server 902 to communicate with one or more other computing devices. Such communication can occur via I/O interfaces 924. Still yet, computer system/server 902 can communicate with one or more networks such as a local area network (LAN), a general wide area network (WAN), and/or a public network (e.g., the Internet) via network adapter 926. As depicted, network adapter 926 communicates with the other components of computer system/server 902 via a bus. It should be understood that although not shown, other hardware and/or software components could be used in conjunction with computer system/server 902. Examples, include, but are not limited to: microcode, device drivers, redundant processing units, external disk drive arrays, RAID systems, tape drives, and data archival storage systems, etc.

Examples of Technological Innovations

One or more of the aforementioned embodiments provide an enhancement to how blockchain itself works rather than an application that uses blockchain. The advantages introduced by the one or more embodiments may retain and/or enforce blockchain characteristics, including but not limited to provenance and immutability. Moreover, one of more of the embodiments may solve technical problems associated with, and may advance, optimizing how data is stored without compromising blockchain characteristics. Replacing blockchain with a traditional database would defeat these improvements altogether.

One or more of the aforementioned embodiments may also represent an improvement to computer functionality utilizing the blockchain (e.g., improve how data is stored, arranged, and or retrieved, reduce data that needs to be stored, implement a new storage mechanism, add security to data, improve processing speed, improve security, etc.). In at least one implementation, the one or more embodiments may improve or optimizes the way data gets stored on a blockchain ledger. For example, recurring values of fields of transactions stored in a ledger may be detected and references to them may be stored on the ledger, as opposed to storing actual values each time they occur in a new transaction to be committed to the ledger. For large field values (e.g. binary files, photos, and BLOBs), storing references consumes much less storage space than storing the actual values (e.g., the content of the binary file). Also, the speed of data retrieval may be improved using a dictionary of references to the first occurrence of such values. Furthermore, one or more embodiments analyze existing data to determine which field value(s) may be good candidates to apply the algorithm. As a result, improved or maximized benefit may be achieved from a data storage savings perspective.

One or more embodiments may also store at least two new types of data in blocks of a blockchain. The first type of new data may include a reference to a prior or first occurrence of the same field value. The reference is stored in place of the field value which is in the data section of a block. The improvement(s) this new data type brings includes, for example, the saving of storage space in the form of the difference between the size of a BLOB or a large binary file and the size to store a reference to the address of a previous occurrence of such an object on the ledger.

The second type of new data may include a dictionary that holds the references mentioned above, for example, in a tree indexed format for faster retrieval. This is stored as data in the data section of a normal data block and is maintained by the blockchain like any other data block, so that it retains privacy, provenance, and immutability of references data, too.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via one or more of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A system comprising:
   a memory; and
   a processor that, when executing instructions stored in the memory, is configured to:
   receive a block;
   extract information from the block;
   identify that the information was previously stored in a first storage area;
   in response to the identification, correlate an identifier to the previously stored information to link the identifier to the previously stored information;
   replace the information in the block with the identifier;
   store the block with the identifier in a second storage area in a blockchain; and
   retrieve the first information from the first storage in response to a query accessing the blockchain.

2. The system of claim 1, wherein the first storage area is in the blockchain.

3. The system of claim 1, wherein the identifier is a transaction identifier that identifies a transaction that includes the previously stored information in the first storage area.

4. The system of claim 1, wherein a size of the identifier is less than a size of the information.

5. The system of claim 1, wherein, when the processor correlates the identifier, the processor is further configured to:
   correlate the identifier to the information previously stored in the first storage area based on a decision tree that logically relates the identifier to the information.

6. The system of claim 1, wherein, when the processor identifies that the information was previously stored in a first storage area, the processor is further configured to:
   search a dictionary that stores a plurality of identifiers that link different information to different storage areas;

locate the identifier corresponding to the information; and retrieve the identifier from the dictionary.

7. The system of claim 6, wherein the plurality of identifiers are linked to respective nodes of a decision tree that logically associates the plurality of identifiers with the different information.

8. A method comprising:

receiving a block;

extracting information from the block;

identifying that the information was previously stored in a first storage area;

in response to the identifying, correlating an identifier to the previously stored information to link the identifier to the previously stored information;

replacing the information in the block with the identifier; and storing the block with the identifier for storage in a second storage area in a blockchain; and retrieving the first information from the first storage in response to a query accessing the blockchain.

9. The method of claim 8, wherein the first storage area is in the blockchain.

10. The method of claim 8, wherein the identifier is a transaction identifier that identifies a transaction that includes the previously stored information in the first storage area.

11. The method of claim 8, wherein a size of the identifier is less than a size of the information.

12. The method of claim 8, wherein the correlating the identifier further comprises:

correlating the identifier to the information previously stored in the first storage area based on a decision tree that logically relates the identifier to the information.

13. The method of claim 8, wherein the identifying that the information was previously stored in a first storage area further comprises:

searching a dictionary that stores a plurality of identifiers linking different information to different storage areas;

locating the identifier corresponding to the information; and retrieving the identifier from the dictionary.

14. The method of claim 13, wherein the plurality of identifiers linked to respective nodes of a decision tree that logically associates the plurality of identifiers with the different information.

15. A computer program product comprising a computer-readable storage medium storing instructions that, when executed by one or more processors, cause the one or more processors to:

receive a block;

extract information from the block;

identify that the information was previously stored in a first storage area;

in response to the identification, correlate an identifier to the previously stored information to link the identifier to the previously stored information;

replace the information in the block with the identifier; and store the block with the identifier in a second storage area in a blockchain; and retrieve the first information from the first storage in response to a query accessing the blockchain.

16. The medium of claim 15, wherein the first storage area and the second storage area are in the blockchain.

17. The medium of claim 15, wherein the identifier is a transaction identifier that identifies a transaction that includes the previously stored information in the first storage area.

18. The medium of claim 15, wherein a size of the identifier is less than a size of the information.

19. The medium of claim 15, wherein, when the instructions cause the one or more processors to correlate the identifier, the instructions further cause the one or more processors to:

correlate the identifier to the information previously stored in the first storage area based on a decision tree that logically relates the identifier to the information.

20. The medium of claim 15, wherein, when the instructions are executed by the one or more processors to correlate the identifier, the one or more processors are to:

search a dictionary that stores a plurality of identifiers linking different information to different storage areas;

locate the identifier corresponding to the information; and retrieve the identifier from the dictionary, wherein the plurality of identifiers are linked to respective nodes of a decision tree that logically associates the plurality of identifiers with the different information.

* * * * *